(12) United States Patent
Ishiguro

(10) Patent No.: US 8,564,842 B2
(45) Date of Patent: Oct. 22, 2013

(54) IMAGE PROCESSING APPARATUS, IMAGE PROCESSING METHOD AND RECORDING MEDIUM FOR APPLYING DIFFERENT IMAGE PROCESSING TO DIFFERENT SCANNED IMAGE REGIONS

(75) Inventor: Kazuhiro Ishiguro, Toyohashi (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 800 days.

(21) Appl. No.: 12/710,484

(22) Filed: Feb. 23, 2010

(65) Prior Publication Data
US 2010/0214620 A1    Aug. 26, 2010

(30) Foreign Application Priority Data
Feb. 25, 2009  (JP) ................................. 2009-042928

(51) Int. Cl.
H04N 1/40 (2006.01)

(52) U.S. Cl.
USPC ........... 358/3.28; 358/1.9; 358/3.06; 358/540

(58) Field of Classification Search
None
See application file for complete search history.

(56) References Cited

U.S. PATENT DOCUMENTS

| | | | | |
|---|---|---|---|---|
| 5,239,390 A * | 8/1993 | Tai | ................................ | 358/3.26 |
| 5,625,460 A * | 4/1997 | Tai | ................................ | 358/3.14 |
| 5,696,365 A | 12/1997 | Ukai et al. | | |
| 6,731,400 B1 * | 5/2004 | Nakamura et al. | ............. | 358/1.9 |
| 6,771,836 B2 * | 8/2004 | Lawton | ........................ | 382/260 |
| 6,980,654 B2 | 12/2005 | Alasia et al. | | |
| 7,376,268 B2 * | 5/2008 | Shirata et al. | .................. | 382/167 |
| 7,697,716 B2 * | 4/2010 | Miller et al. | ................... | 382/100 |
| 7,854,383 B2 * | 12/2010 | Suzuki | ....................... | 235/462.01 |
| 7,880,925 B2 * | 2/2011 | Fuchigami | ...................... | 358/1.9 |
| 7,907,308 B2 | 3/2011 | Namikata | | |
| 8,104,685 B2 * | 1/2012 | Seo | .............................. | 235/462.1 |
| 8,310,691 B2 * | 11/2012 | Hikichi | ......................... | 358/1.14 |
| 8,316,415 B2 * | 11/2012 | Hwang | .............................. | 726/1 |
| 2006/0164682 A1 * | 7/2006 | Lev | ............................... | 358/1.15 |

(Continued)

FOREIGN PATENT DOCUMENTS

| | | |
|---|---|---|
| JP | 03-136468 | 6/1991 |
| JP | 4-096471 A | 3/1992 |

(Continued)

OTHER PUBLICATIONS

Notification of Reasons for Rejection issued in Japanese Patent Application No. 2011-090328, which is a divisional of Japanese Patent Application No. 2009-042928, mailed Sep. 25, 2012, and English translation thereof.

(Continued)

Primary Examiner — Dung Tran
(74) Attorney, Agent, or Firm — Buchanan Ingersoll & Rooney

(57) ABSTRACT

An image processing apparatus of the invention specifies, in a scanned image of an original, a first region including a specific form pattern (a two-dimensional bar-code pattern or the like) with the digital information embedded therein and a second region not including the specific form pattern to apply the image processing to the scanned image. More particularly, the image processing apparatus applies different processing to the first region and the second region, respectively. For example, a working degree to the first region is made smaller than a working degree to the second region to apply the specific image working processing to both the regions.

6 Claims, 25 Drawing Sheets

(56) References Cited

U.S. PATENT DOCUMENTS

2007/0171444 A1* 7/2007 Washino .................. 358/1.9
2007/0172137 A1* 7/2007 Mori ..................... 382/239
2008/0018942 A1   1/2008 Komiya

FOREIGN PATENT DOCUMENTS

| JP | 04-329486 | 11/1992 |
| --- | --- | --- |
| JP | 8-016689 A | 1/1996 |
| JP | 2002-354236 | 12/2002 |
| JP | 2002354236 A * | 12/2002 |
| JP | 2007-505762 | 3/2007 |
| JP | 2008-026874 A | 2/2008 |
| JP | 2008-219421 A | 9/2008 |

OTHER PUBLICATIONS

Office Action (Notification of Reasons for Refusal) dated Feb. 15, 2011, issued in the corresponding Japanese Patent Application No. 2009-042928, and an English Translation thereof.

Office Action (Notification of Reason for Rejection) dated Sep. 13, 2011, issued in the corresponding Japanese Patent Application No. 2009-042928, and an English Translation thereof.

* cited by examiner

Fig.18

| PROCESSING TYPE CONTENTS | PROCESSING TYPE NO. | INFORMATION INSIDE TWO-DIMENSIONAL CODE | SETTABLE RANGE IN MFP | NORMAL VALUE |
|---|---|---|---|---|
| LIGHTNESS | P01 | 0.5 ~ 1.2 | 0.1 ~ 4.0 | 1.0 |
| SMOOTHING | P02 | WEAK, INTERMEDIATE | WEAK, INTERMEDIATE, STRONG | STRONG |
| MAGNIFICATION | P03 | 1.00 ~ 4.00 | 0.25 ~ 4.00 | 1.0 |
| | P20 | | | |

| MODEL CODE | PROCESSING TYPE NO. | PROCESSING TYPE CONTENTS | ACCEPTABLE RANGE |
|---|---|---|---|
| M001 | P01 | LIGHTNESS | 0.5 ~ 1.2 |
| | P02 | SMOOTHING | WEAK |
| | P03 | MAGNIFCATION | 1.00 ~ 4.00 |
| | ⋮ | ⋮ | ⋮ |
| | P20 | | |
| M002 | P01 | LIGHTNESS | 0.4 ~ 1.5 |
| | P02 | MAGNIFCATION | 0.80 ~ 4.00 |
| | P03 | SMOOTHING | WEAK, INTERMEDIATE |
| | ⋮ | ⋮ | ⋮ |
| | P20 | | |
| M003 | P01 | LIGHTNESS | 0.3 ~ 1.5 |
| | P02 | SMOOTHING | WEAK, INTERMEDIATE, STRONG |
| | P03 | MAGNIFCATION | 0.60 ~ 4.00 |
| | P04 | EDGE ENHANCEMENT PROCESSING | 0.8 ~ 1.5 |
| | ⋮ | ⋮ | ⋮ |
| | P20 | | |

IMAGE PROCESSING APPARATUS, IMAGE PROCESSING METHOD AND RECORDING MEDIUM FOR APPLYING DIFFERENT IMAGE PROCESSING TO DIFFERENT SCANNED IMAGE REGIONS

This application is based on Japanese Patent Application No. 2009-042928 filed on Feb. 25, 2009, the contents of which are hereby incorporated by reference.

BACKGROUND OF THE INVENTION

1. Field of the Invention

The present invention relates to an image processing technique of applying image processing to a scanned image.

2. Description of the Background Art

There exists a technique of adding appropriate information and the like to a print surface of a print output and printing the resultant when an original is printed out.

For example, in Japanese Patent Application Laid-Open No. 8-16689, there has been described a technique of converting inputted data to a bar-code pattern image (merely referred to as a bar-code pattern) to synthesize an original image and the bar-code pattern and output the resultant. In other words, a technique of generating a print output in which digital information is embedded as a bar-code pattern is described.

Generally, in a copy apparatus, in many cases, an overall scanned image is subjected to image correction processing and the scanned image after the image correction processing is printed out as a copied image. As such image correction processing, for example, processing aimed to prevent moire occurrence, specifically, smoothing processing, edge enhancement processing and the like are applied.

Here, suppose that a print output with digital information embedded by the above-described technique is copied by a copy apparatus. In such a situation, the image correction processing such as smoothing processing may be executed to a scanned image relating to the print output.

However, when the above-described smoothing processing and the like are applied to the scanned image in the image correction processing at the time of copy, a bar-code pattern inside the scanned image is printed out in a deteriorated state due to the smoothing processing and the like. Therefore, when the print output in copy operation (i.e., copy output) is further copied, a reading ratio of the digital information inside the bar-code pattern is decreased. That is, the reading ratio of the digital information at the time of copy in succeeding generations is decreased.

SUMMARY OF THE INVENTION

In order to solve the above-described problem, this invention provides an image processing technique capable of suppressing deterioration of a specific form pattern (bar-code pattern or the like) in copying or scanning a print output on which the specific form pattern including digital information is printed.

A first aspect of the present invention is an image processing apparatus including an acquisition unit that acquires a scanned image of an original, a specification unit that specifies, in the scanned image, a first region including a specific form pattern with digital information embedded therein and a second region not including the specific form pattern, and an image processing unit that applies image processing to the scanned image, wherein the image processing unit applies different processing to the first region and the second region, respectively.

A second aspect of the present invention is an image processing method including the steps of a) specifying, in a scanned image, a first region including a specific form pattern with digital information embedded therein and a second region not including the specific form pattern, and b) applying different image processing to the first region and the second region, respectively.

A third aspect of the present invention is a recording medium that stores a program for causing a computer to execute the steps of a) specifying, in a scanned image, a first region including a specific form pattern with digital information embedded therein and a second region not including the specific form pattern, and b) applying different image processing to the first region and the second region, respectively.

A fourth aspect of the present invention is an image processing apparatus including an acquisition unit that acquires a scanned image of an original, a specification unit that specifies, in the scanned image, a first region including a specific form pattern with digital information embedded therein and a second region not including the specific form pattern, and an image processing unit that applies image processing to the scanned image, wherein the image processing unit applies specific image working processing to one region of the first region and the second region, and does not apply the specific image working processing to the other region of both the regions.

A fifth aspect of the present invention is an image processing method, including the steps of a) specifying, in a scanned image, a first region including a specific form pattern with digital information embedded therein and a second region not including the specific form pattern, and b) applying specific image working processing that is not applied to one region of the first region and the second region, to the other region of the both regions.

A sixth aspect of the present invention is a recording medium that stores a program for causing a computer to execute the steps of a) specifying, in a scanned image, a first region including a specific form pattern with digital information embedded therein and a second region not including the specific form pattern, and b) applying specific image working processing that is not applied to one region of the first region and the second region, to the other region of both the regions.

These and other objects, features, aspects and advantages of the present invention will become more apparent from the following detailed description of the present invention when taken in conjunction with the accompanying drawings.

BRIEF DESCRIPTION OF THE DRAWINGS

FIG. 18 is a diagram showing acceptable ranges of working degrees and the like of respective types of image working processing;

FIG. 21 is a diagram showing a data table included in the MFP;

DESCRIPTION OF THE PREFERRED EMBODIMENTS

Hereinafter, embodiments of the present invention are described with reference to the drawings.

<1. First Embodiment>

<1-1. System Outline>

Figure 1:
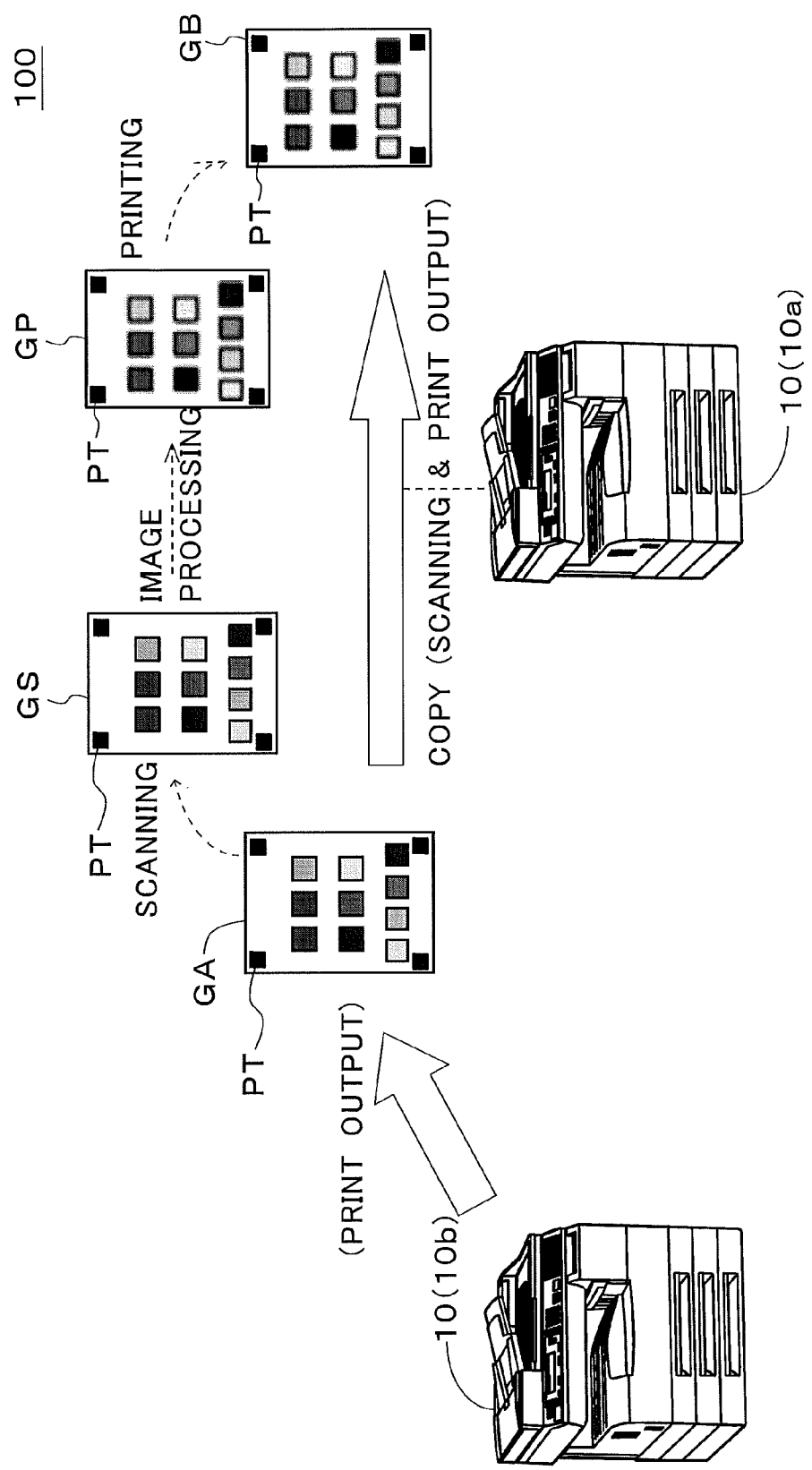
FIG. 1 is a schematic diagram showing a system configuration.

FIG. 1 is a schematic diagram showing a configuration of a system 100. The present system 100 includes a plurality of multi function peripherals (also referred to as MFPs) 10 (particularly, MFPs 10a, 10b and the like).

The MFP 10 is an apparatus including a scanner function, a printer function, a copy function, a facsimile communication function and the like (also referred to as a combined machine). The MFP 10 is also referred to as an image forming apparatus. The MFP 10 (especially, MFP 10a) is also referred to as an image processing apparatus because it is an apparatus that executes image processing to a scanned image or the like.

In this system 100, for example, a print output GA printed out by the MFP 10b is copied by the MFP 10a, and a copy output GB is outputted. In other words, the print output GA (original to be subjected to copy processing) is generated using the print output function of the MFP 10b, and the copy output GB is generated using the copy function of the MFP 10a. In this embodiment, a description is given, centering around the copy operation by the MFP 10a.

Figure 2:
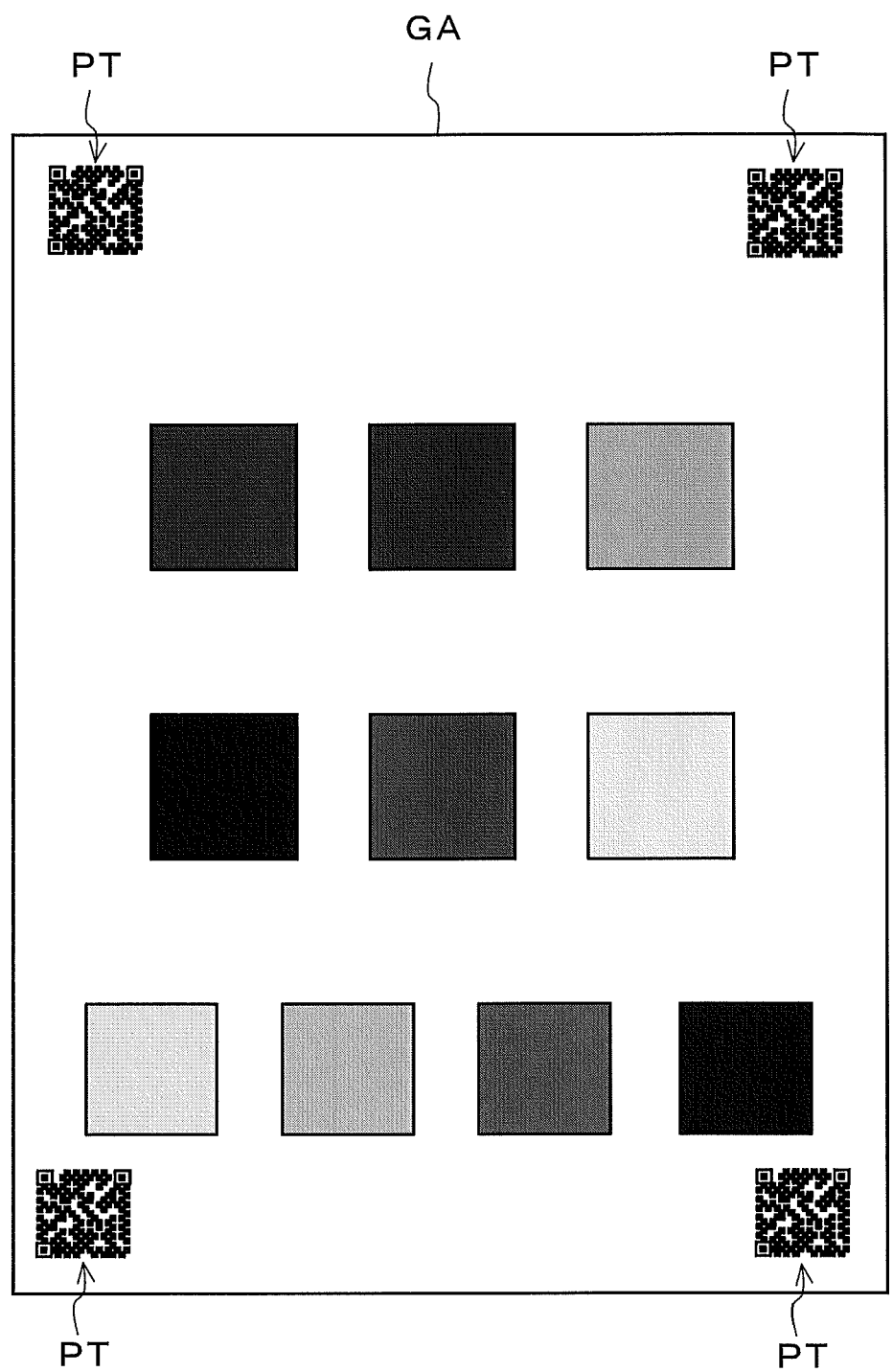
FIG. 2 is a diagram showing an original to be subjected to copy processing.

As shown in FIG. 2, the print output GA has, in the print output surface, not only contents of an original (in this case, expressed by ten rectangles arrayed in three rows in a screen center) but also two-dimensional bar-code patterns PT. Here, the two-dimensional barcode patterns are arranged in four corners of the print output GA, respectively. Various types of information can be embedded in the respective two-dimensional bar-code patterns. For example, a copyright notice and the like relating to the print output GA and the like are embedded in the two-dimensional bar-code patterns.

As described above, the image correction processing is often executed to a scanned image at the time of copy. For example, smoothing processing, edge enhancement processing and the like are applied for the purpose of moire occurrence prevention and the like. Particularly, when reading performance (reading resolution or the like) of an image reading unit (scanner unit 12) of the MFP 10a is low, relatively strong smoothing processing is executed as compared with a case where performance of the image reading unit 12 of the MFP 10a is high. An image GC in FIG. 3 is a conceptual diagram showing a state where such relatively strong smoothing processing is applied.

Figure 3:
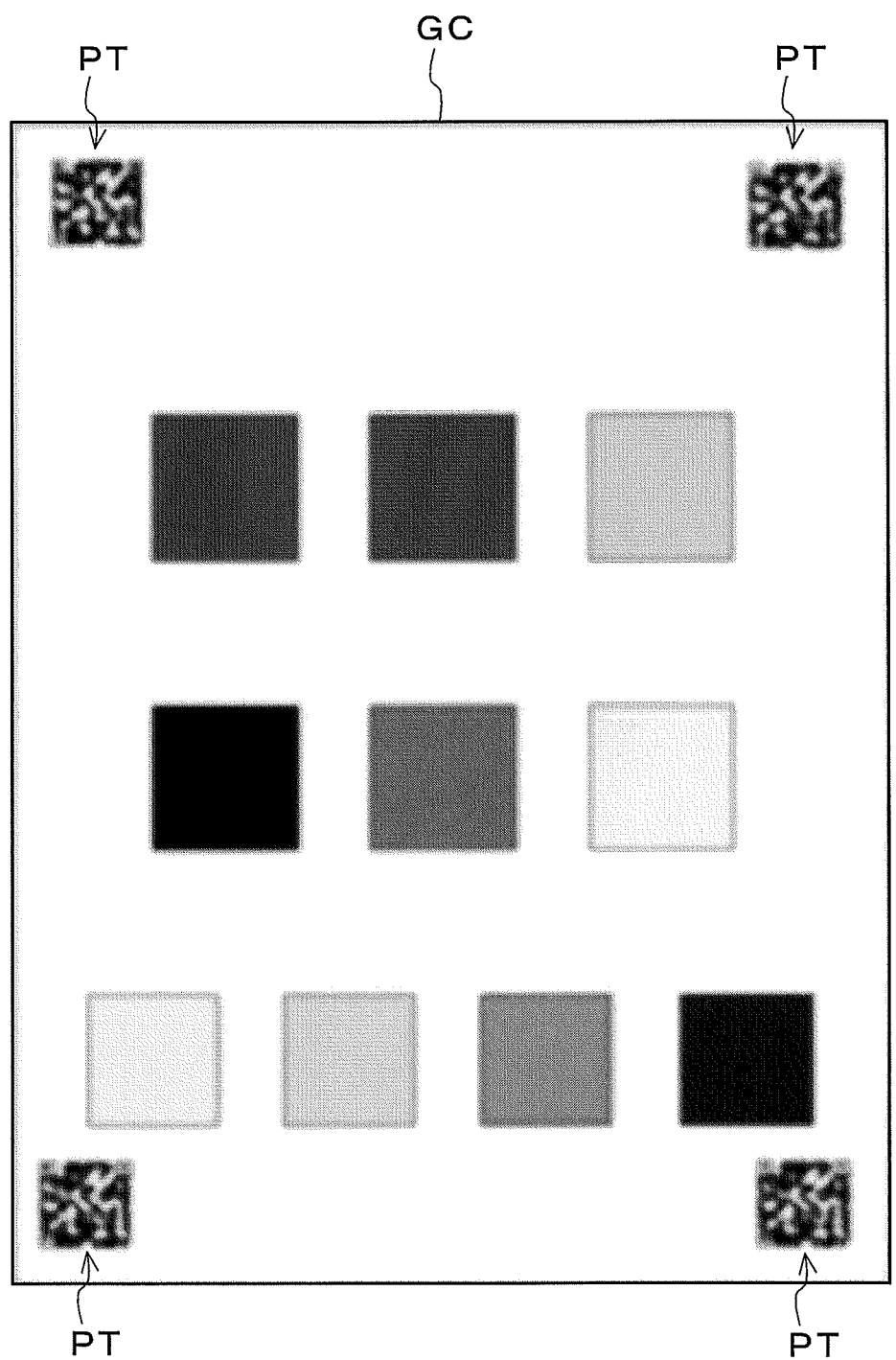
FIG. 3 is a diagram showing a state where relatively strong smoothing processing is applied to an overall scanned image.

However, as shown in FIG. 3, as a result of applying the relatively strong smoothing processing not only to the contents of the original (the ten rectangles arranged in the central three rows) but also to the bar-code patterns PT, the bar-code patterns PT of the image GC may be getting rough and may be lacking in preciseness. As a result, there arises a problem that when this image GC is further copied, the bar-code patterns PT cannot be read.

Figure 4:
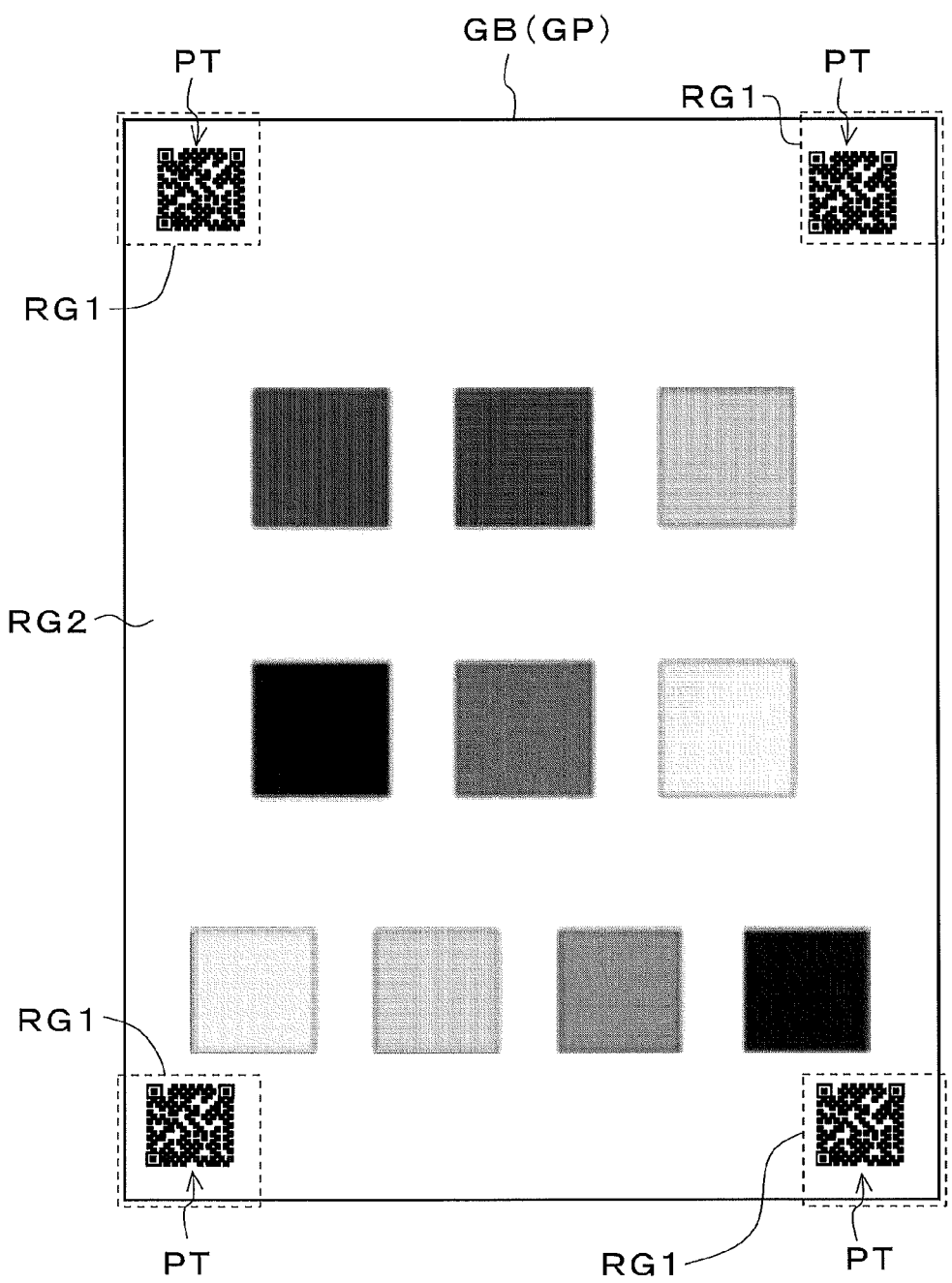
FIG. 4 is a diagram showing an example of an image processing result according to the present invention.
Figure 7:
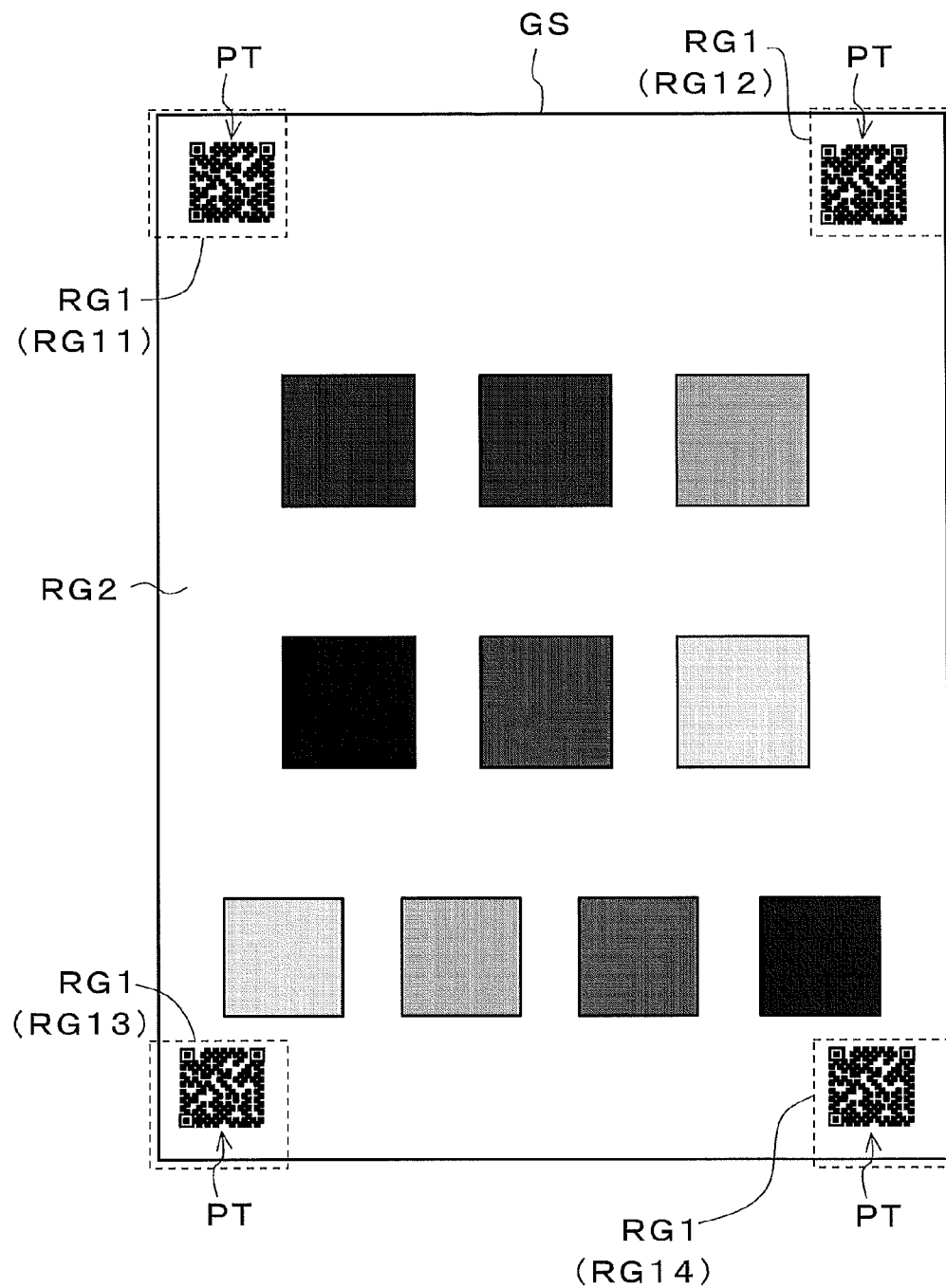
FIG. 7 is a diagram showing the scanned image before the image processing.

Consequently, in this embodiment, as described later, when a print output on which a specific form pattern (two-dimensional bar-code or the like) is printed is copied, a first region RG1 including the specific form pattern and a second region RG2 not including the specific form pattern are specified in a scanned image GS (FIG. 7). A specific form pattern (two-dimensional bar-code or the like) is also referred to as a pattern in a specific form. The scanned image GS shown in FIG. 7 is a scanned image before the image processing. Different types of image processing from each other are then performed to both the regions RG1, RG2. Specifically, while the MFP 10a applies specific image working processing (smoothing processing) to the second region RG2, the MFP 10a does not apply the specific image working processing (smoothing processing) to the first region RG1. In this manner, an image GP for print output (also referred to as a scanned image after the image processing) is generated (refer to FIG. 4). FIG. 4 shows that while the smoothing processing is applied to the region RG2, the smoothing processing is not applied to the two-dimensional bar-code pattern PT inside the region RG1, and the two-dimensional bar-code pattern PT is maintained in a clear state. According to the above-described image processing, deterioration of the two-dimensional bar-code pattern PT due to the smoothing processing can be avoided.

The MFP 10 that executes the above-described operation is described in more detail below.

<1-2. Detailed Configuration of MFP 10>

Figure 5:
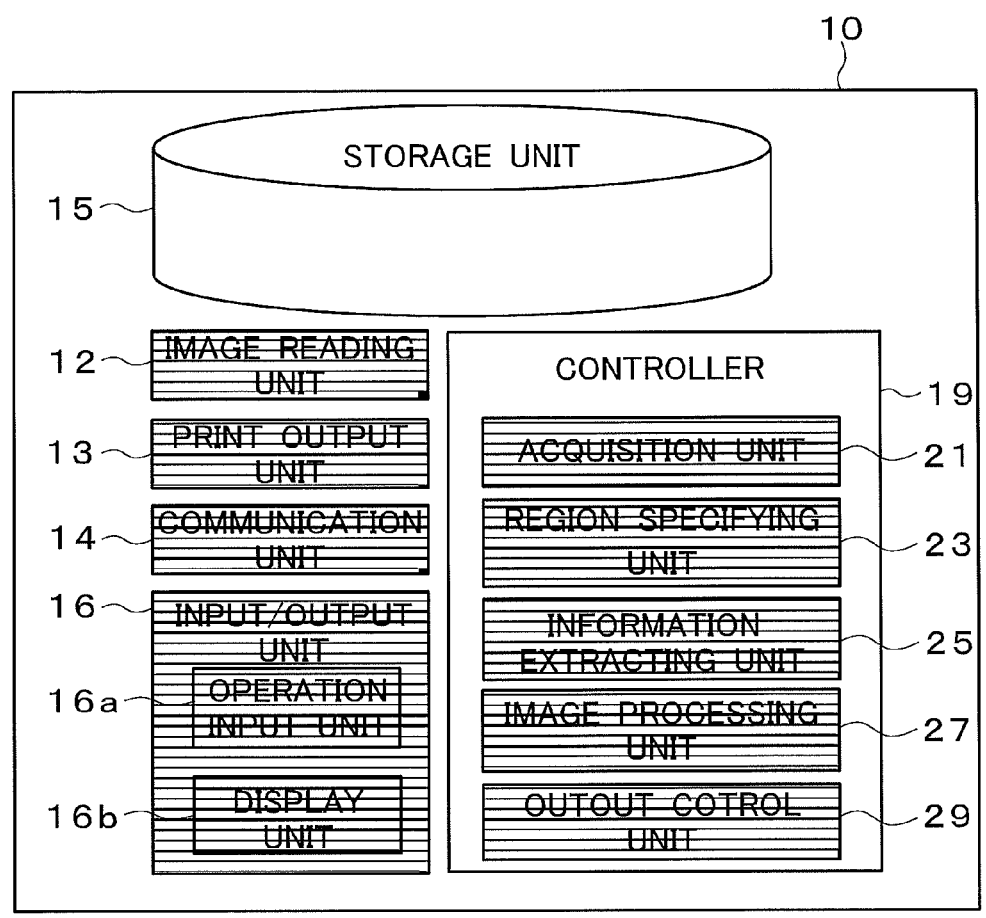
FIG. 5 is a functional block diagram showing a detailed configuration of an MFP.

Referring to FIG. 5, a detailed configuration of each of the MFPs 10 is described. FIG. 5 is a functional block diagram showing a functional configuration of each of the MFPs 10.

The MFP 10, as shown in FIG. 5, includes the image reading unit 12, a print output unit 13, a communication unit 14, a storage unit 15, an input/output unit 16, and a controller 19, and by operating these units complexly, the above-described functions are realized.

The image reading unit 12 is a processing unit that optically reads an original placed in a predetermined position of the MFP 10 and generates image data of the original (also referred to as an original image).

The print output unit 13 is an output unit that prints out an image onto various media such as paper based on image data relating to an object image.

The communication unit 14 is a processing unit capable of performing facsimile communication through a public line or the like. Furthermore, the communication unit 14 is capable of network communication through a communication network. In this network communication, various protocols such as TCP/IP (Transmission Control Protocol/Internet Protocol) and FTP (File Transfer Protocol) are utilized, and through the use of the network communication, the MFP 10 can receive and transmit various types of data between a desired party and itself.

The storage unit 15 is made of a storage device such as a hard disk drive (HDD). In this storage unit 15, the original image generated by the image reading unit 12 and the like is stored. Also, in the storage unit 15, parameters defining working degrees and the like of the various types of image processing (smoothing processing and the like) are stored. "Working degrees" are also referred to as "processing degrees".

The input/output unit 16 includes an operation input unit 16a that receives input to the MFP 10, and a display unit 16b that performs display output of various types of information.

The controller 19 is a control device that integrally controls the MFP 10, and includes a CPU and various semiconductor memories (RAM, ROM and the like). The various control units operate under the control of the controller 19, by which various functions of the MFP 10 are realized. For example, under the control of the controller 19, a desired original is optically read using the image reading unit 12 and thereby, an image obtained by scanning the original (scanned image) is acquired, by which the scanner function is realized. Further, the scanned image is printed out using the print output unit 13, by which the copy function is realized. Moreover, the controller 19 controls various types of processing as described below.

The controller 19 executes, in the CPU, a predetermined software program (hereinafter, merely referred to as a program as well) stored in the ROM (e.g., EEPROM or the like), by which the various processing units are realized.

Specifically, the controller 19 realizes the various processing units including an acquisition unit 21, a region specifying unit 23, an information extracting unit 25, an image processing unit 27, and an output control unit 29.

The acquisition unit 21 is a processing unit that acquires the scanned image GS relating to the print output (original) GA, for example, the scanned image GS generated by the image reading unit 12.

The region specifying unit 23 is a processing unit that specifies the first region RG1 and the second region RG2 in the scanned image GS (refer to FIG. 7). As described above, the first region RG1 is a region including the two-dimensional bar-code pattern PT in which the digital information is embedded. The region RG1 is a region that includes the two-dimensional bar-code pattern PT and also includes some margin regions (e.g., of about 0.1 mm to several mm) outward in horizontal and vertical directions from the two-dimensional bar-code pattern PT. Moreover, the second region RG2 is a region not including the two-dimensional bar-code pattern. In this region RG2 is, here, the overall region excluding the region RG1 in the scanned image GS.

The information extracting unit 25 is a processing unit that analyzes the two-dimensional bar-code pattern PT, and extracts the digital information embedded in the two-dimensional bar-code pattern.

The image processing unit 27 is a processing unit that applies the image processing to the scanned image GS.

The output control unit 29 is a processing unit that controls output operation (print output operation or the like) relating to the image GP subjected to the predetermined image processing to the scanned image GS. The output control unit 29 controls, as the output operation, not only the print output operation but also output operation through the network communication or the like (data transfer output operation) and so on.

<1-3. Operation of MFP 10a>

Figure 6:
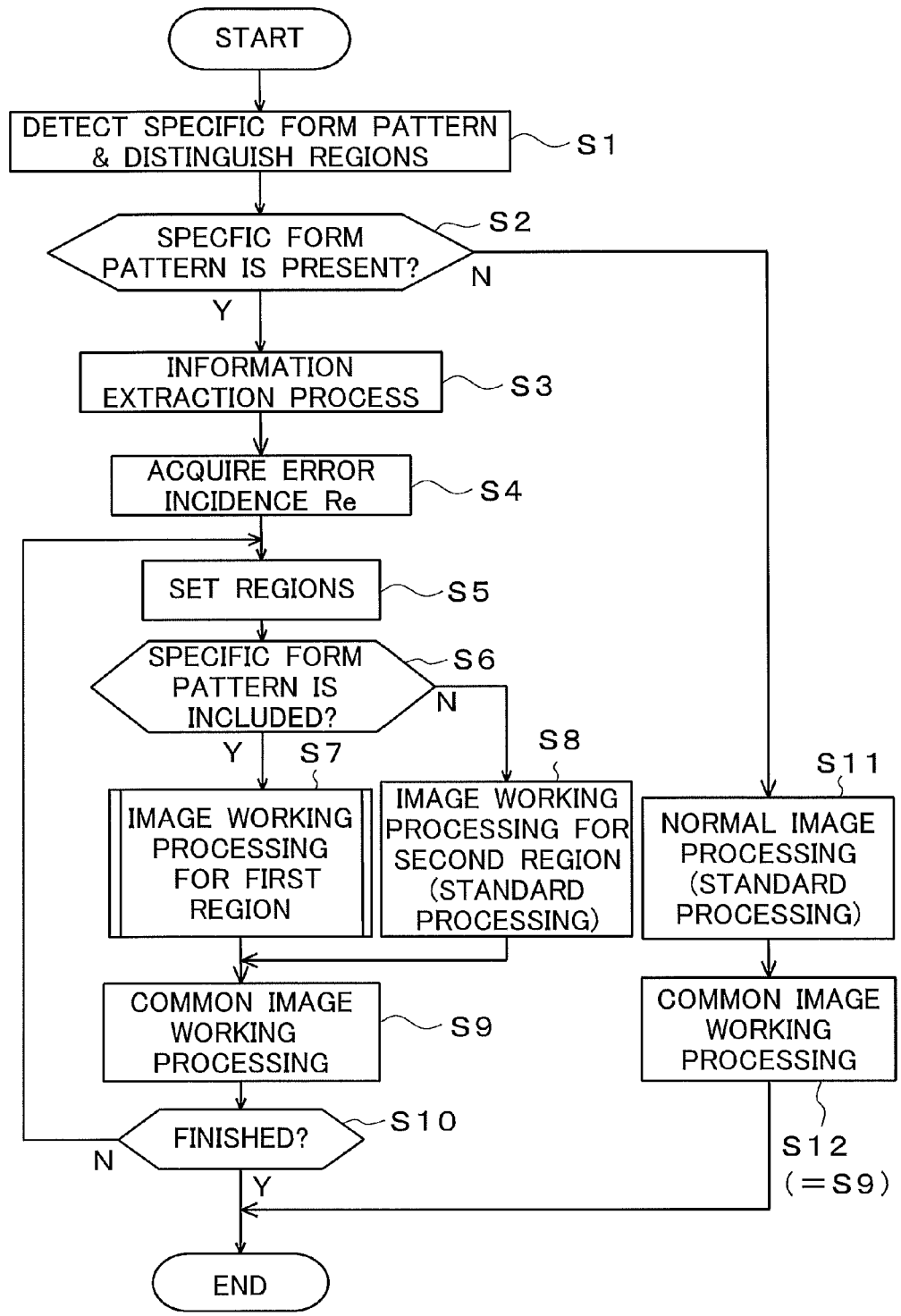
FIG. 6 is a flowchart showing operation of the MFP.

Next, the operation of the MFP 10a is described in detail with reference to FIG. 6. FIG. 6 is a flowchart showing the operation of the MFP 10a. Here, suppose that the scanned image GS relating to the print output (original) GA has already been acquired by the image reading unit 12 and the acquisition unit 21.

Thereafter, in step S1, the two-dimensional bar-code pattern PT in the scanned image GS is detected, and based on the detection result, both the regions RG1, RG2 in the scanned image are specified, respectively. Particularly, executing the above-described operation by the region specifying unit 23 allows the respective regions RG1, RG2 to be specified. Here, a total of five regions of the four regions RG1 (RG11 to RG14) and the single region RG2 are recognized by the MFP 10a (refer to FIG. 7).

Next, in step S2, based on the detection result in step S1, whether or not the two-dimensional bar-code pattern PT is included in the scanned image GS is determined.

If the two-dimensional bar-code pattern PT is not included in the scanned image GS, the processing proceeds to the step S11 to apply normal image processing. For example, the smoothing processing and the edge enhancement processing are executed to normal working degrees (default parameters), respectively. The processing then proceeds to step S12. In step S12, processing similar to step S9 described later is applied in step S12.

On the other hand, if it is determined that the two-dimensional bar-code pattern PT is included in the scanned image GS, the processing proceeds to step S3.

In step S3, the digital information embedded in the two-dimensional bar-code pattern PT is extracted. For example, the digital information such as copyright notice is extracted form the two-dimensional bar-code pattern PT.

In step S4, an error detection ratio Re during the digital information extraction in step S3 is calculated. Here, the error detection ratio Re is a detection percentage of errors detected in code error detection processing by giving a parity bit or the like (so-called parity check). As will be described later, in this first embodiment, a case is exemplified where the contents of the image processing (particularly, presence and absence of the specific image working processing) are changed using the error detection ratio Re as well.

Figure 8:
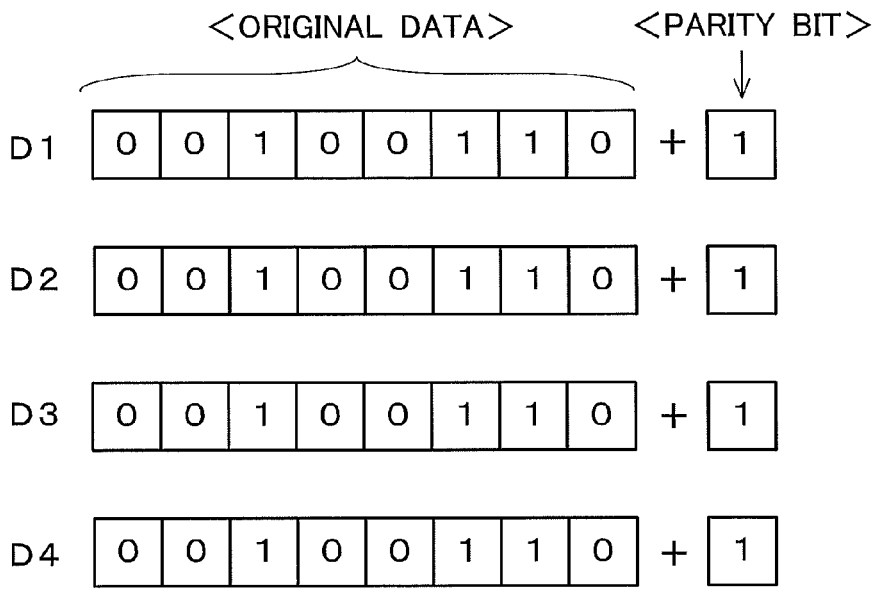
FIG. 8 is a diagram showing parity check operation.
Figure 9:
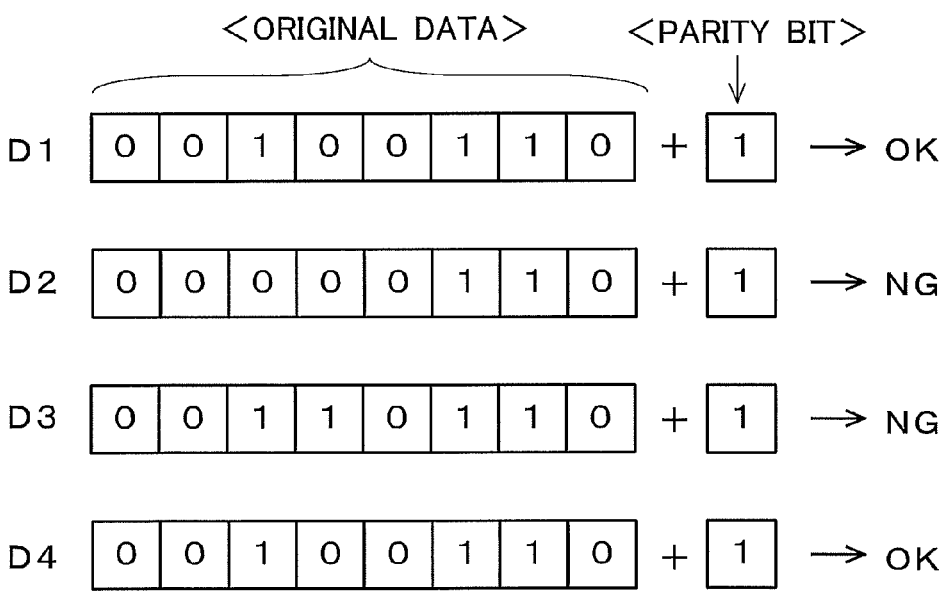
FIG. 9 is a diagram showing the parity check operation.

FIGS. 8 and 9 are schematic diagrams for explaining a principle of the above-described error detection processing. Here, referring to FIGS. 8 and 9, the parity check operation that detects an error of one bit is described.

FIG. 8 is a diagram showing how the parity bit of one bit is added to data of 8 bits. Here, even parity check is described.

In the even parity check, a parity bit is set so that a sum of bits in data (D1 or the like) with the parity bit added is an even number. For example, the sum of original bits inside of the data D is 0+0+1+0+0+1+1+0=3, that is, an odd number. Since in the even parity check, the parity bit is set so that the sum of the original data and the parity bit is an even number, the parity bit is set to "1". Here, for simplification, other pieces of data D2 to D4 are configured as similar data strings.

On the other hand, FIG. 9 is a diagram showing an example of the digital data extracted from the two-dimensional bar-code pattern PT.

As to the data D1, D4 after the extraction, since the sum of the original data and the parity bit is four, that is, an even number, it is confirmed that the data is not erroneous, and in contrast, as to the data D2 after the extraction, since the sum of the original data and the parity bit is three (=(0+0+0+0+0+1+1+0)+1), that is, an odd number, it is detected that an error exists in the data. Similarly, as to the data D3 after the extraction, since the sum of the original data and the parity bit is 5 (=(0+0+1+1+0+1+1+0)+1), that is, an odd number, it is detected that an error exists in the data.

In this manner, when the four pieces of data D1 to D4 are detected, errors are detected from the two pieces of data D2, D3. At this time, since the errors are detected from the two pieces of data among a total data number TN (=4), the error detection ratio Re is detected as Re=2/4, that is, 50%. When this is generalized, the error detection ratio Re is expressed as Re=EN/TN. A value EN is a number of the detected errors (number of error detections).

In steps S3, S4, according to the above-described principle, the error detection processing is performed and the error detection ratio Re is calculated. While in the foregoing, the parity check capable of detecting an error of one bit is described, the present embodiment is not limited to this, but parity check capable of detecting an error of two bits or more, and the like may be performed. For example, error detection processing using a Reed-Solomon code may be performed.

Here, in step S4, the error detection ratio Re relating to the whole of the plurality of regions RG11 to RG14 is acquired.

Next, in step S5, these five regions are sequentially set as processing object regions. Specifically, in step S5, the respective regions RG11, RG2, RG12, RG13, RG14 are set as the processing object regions, for example, in this order until it is determined in step S10 that the processing for all the regions has been finished.

In step S6, it is determined whether or not each of the processing object regions is a region including the two-dimensional bar-code pattern PT.

If it is determined that the processing object region is not the region including the two-dimensional bar-code pattern PT, that is, that the processing object region is the region RG2, then the processing proceeds to step S8. In step S8, image working processing for the second region RG2 is applied. Here, as the image working processing for the region RG2, so-called normal image correction processing (smoothing processing) is applied. Particularly, the smoothing processing to a stronger working degree, more specifically, the "strong" smoothing processing to a largest degree is applied among smoothing degrees (working degrees) expressed by three levels "strong", "intermediate" and "weak". Here, the working degree of the smoothing processing in step S8 is the same as the degree of the smoothing processing in step S11. In this manner, when the central region RG2 is set as the processing object region, the image working processing for the second region RG2 is executed in step S8. When the processing in step S8 ends, the processing proceeds to step S9.

On the other hand, if it is determined that the processing object region is the region including the two-dimensional bar-code pattern PT, that is, that the processing object region is the region RG1, the processing proceeds from the step S6 to step S7. For example, when the region RG11 is set as the processing object region, the processing proceeds to step S7.

In step S7, the image working processing for the first region RG1 is executed.

Figure 10:
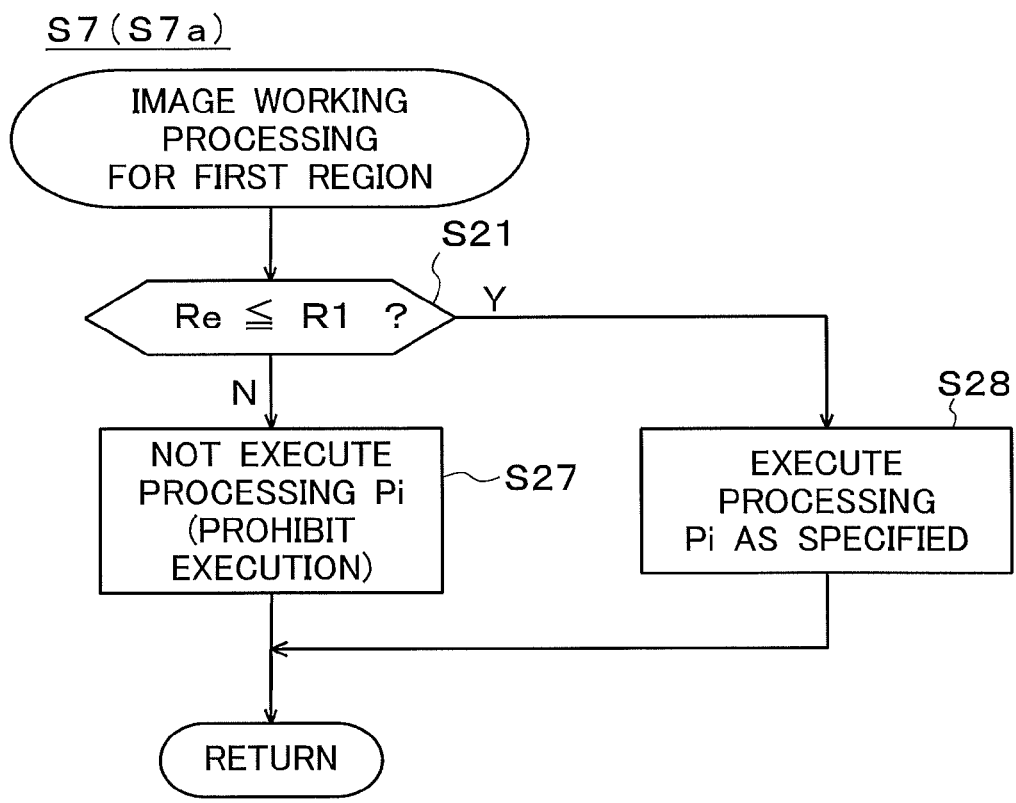
FIG. 10 is a flowchart showing details of a part of the operation in FIG. 6.

FIG. 10 is a diagram showing detailed operation in step S7. As shown in FIG. 10, first, in step S21, whether or not the error detection ratio Re is larger than a predetermined value R1 (e.g., several percents) is determined.

If the error detection ratio Re is not larger than the predetermined value R1, the extent of deterioration of the scanned image GS is determined to be within an acceptable range, and the processing proceeds to step S28. In step S28, strong smoothing processing same as that in step S8 is executed. This allows the processing in step S7 to end.

On the other hand, if the error detection ratio Re is larger than the predetermined value R1, the deterioration of the scanned image GS is determined to be larger than a predetermined extent, and the processing proceeds to step S27. In step S27, the execution of the smoothing processing is prohibited. As a result, the processing in step S7 ends without performing the smoothing processing. Thereby, for example, when the error detection ratio Re of the region RG1 (RG11 to RG14) is larger than the predetermined value R1, the specific image working processing (smoothing processing) is not applied to the respective regions RG11 to RG14.

Once the processing in step S7 ends, the processing proceeds to step S9.

In step S9, the other image working processing (in this case, the edge enhancement processing) is executed. Here, independent of whether the processing object region is the region RG1 or the region RG2, the other image working processing (edge enhancement processing) is always executed. In other words, the image working processing (edge enhancement processing) in step S9 is executed to the whole of the scanned image GS. Moreover, the image working processing in step S9 is executed with the same parameter (working degree) to both the region RG1 and the region RG2.

In step S10, whether or not the above-described processing (steps S5 to S9) has been finished for all the plurality of regions RG11 to RG14, RG2 is determined. If the unfinished region is present, the processing returns to step S5 to execute the similar operation. If the above-described processing (steps S5 to S9) has been finished for all the regions, the image processing to the scanned image GS ends, so that the image GP (refer to FIGS. 1 and 4) is generated. Thereafter, under the control of the output control unit 29, the image GP subjected to the image processing is printed out using the print output unit 13 to generate the copy output GB.

According to the above-described operation, the different types of processing are applied to the first region RG1 and the second region RG2, respectively. Particularly, while a certain type of image working processing (smoothing processing) among the plurality of types of image working processing included in the image processing to the scanned image GS is executed to the second region RG2, the processing is prohibited to the first region RG1 instead of executing. In other words, the specific image working processing (smoothing processing) applied to the region RG2, that is, one of both the regions of the first region RG1 and the second region RG2 is not applied to the region RG1, that is, the other of both the regions. Accordingly, the deterioration of the specific form pattern (two-dimensional bar-code pattern) inside the first region RG1 can be avoided or reduced while applying the appropriate processing to the second region RG2. Eventually, decrease in reading ratio of the digital information at the time of copy or scanning in the succeeding generations can be suppressed.

Moreover, here, only when the predetermined condition is satisfied, the specific image working processing (smoothing processing) is not applied to the region RG1. Therefore, whether or not to apply the specific image working processing to the region RG1 can be changed depending on the necessity of the specific image working processing and the like. Especially, since as the predetermined condition, the condition that the error detection ratio Re is larger than the predetermined value R1 is employed, a deterioration status of the two-dimensional bar-code patterns PT in the scanned image GS can be reflected properly.

<1-4. Modifications to First Embodiment>

The above-described first embodiment exemplifies the case where only when the condition that the error detection ratio Re is larger than the predetermined value R1 is satisfied, the specific image working processing (smoothing processing) to the region RG1 is prohibited. The present invention, however, is not limited to this. For example, when another condition is also satisfied, the specific image working processing (smoothing processing) to the region RG1 may be prohibited. Alternatively, instead of conditioning the satisfaction of a predetermined condition, the specific image working processing (smoothing processing) to the region RG1 may be prohibited at any time.

Also, the above-described first embodiment exemplifies the case where whether or not to execute the specific image working processing to the region RG1 (RG11 to RG14) based on the error detection ratio Re of the whole of the plurality of regions RG11 to RG14 included in the region RG1 (so-called average value). The present invention, however, is not limited to this. For example, whether or not to execute the specific image working processing (smoothing processing or the like) may be determined for each of the regions RG11 to RG14, based on the error detection ratio Re of each of the regions RG11 to RG14.

Moreover, the above-described first embodiment exemplifies the case where when the error detection ratio Re is equal to the predetermined value R1 in step S21, the processing proceeds to step S28 (FIG. 10). The present invention, however, is not limited to this, when the error detection ratio Re is equal to the predetermined value R1, the processing may proceed to step S27.

Moreover, while the above-described first embodiment exemplifies the case where the edge enhancement processing is executed after the smoothing processing, the edge enhancement processing may be executed before the smoothing processing.

Moreover, the above-described first embodiment exemplifies the case where as the image processing, the two types of the image working processing of the smoothing processing and the edge enhancement processing are executed, and only the smoothing processing of both the types of image working processing is selectively executed to both the regions RG1 and RG2. The present invention, however, is not limited to this.

For example, step S9 (FIG. 6) may be deleted, and only the smoothing processing may be executed as the image processing. More specifically, the edge enhancement processing may not be executed to either of the regions RG1, RG2, and only the smoothing processing may be selectively executed to both the regions RG1, RG2 as the image processing.

Moreover, the image working processing selectively executed to both the regions RG1, RG2 is not limited to the above-described smoothing processing.

For example, the above-described concept may be applied to density adjustment processing (especially, density reduction processing).

Figure 11:
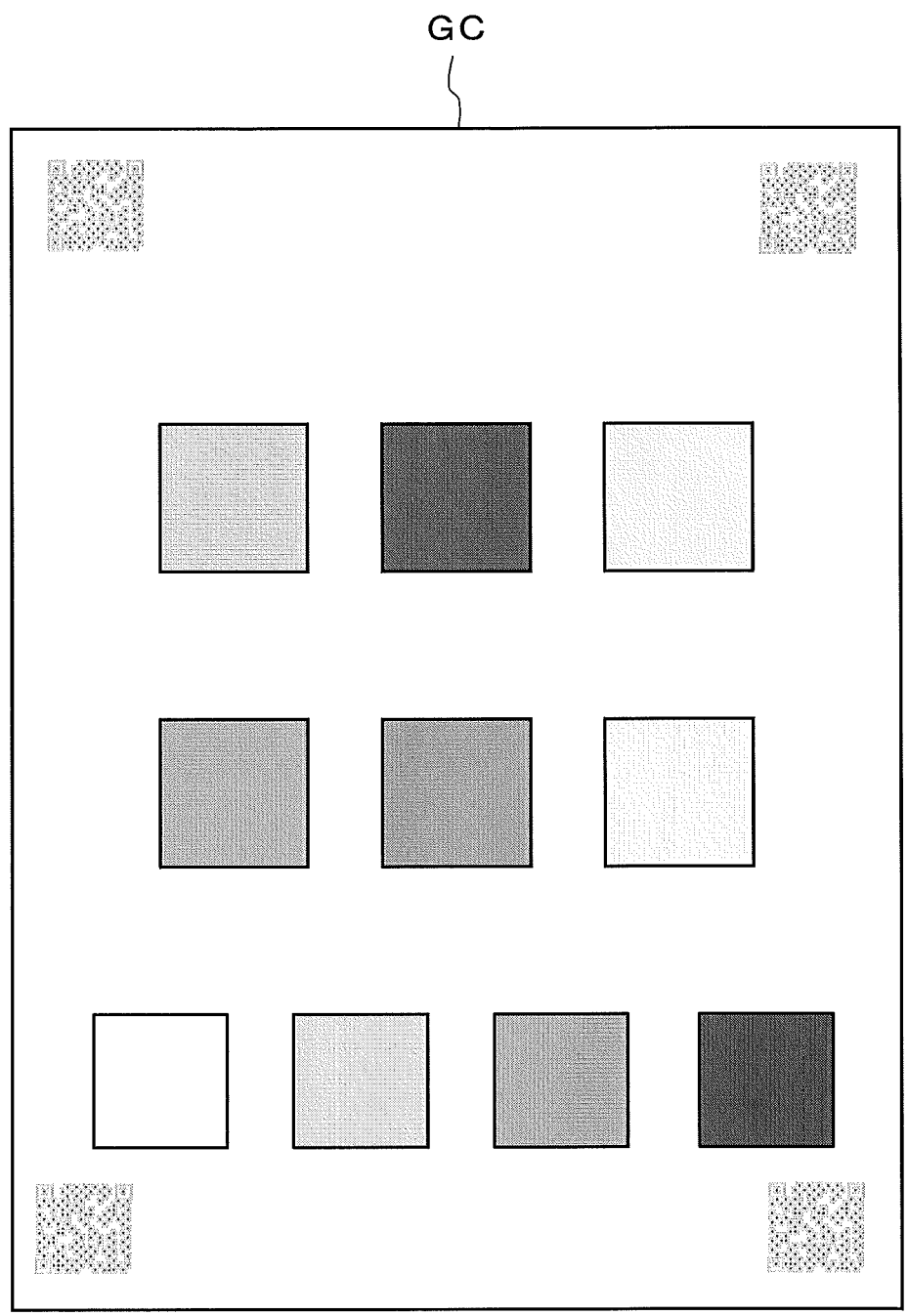
FIG. 11 is a diagram showing a state where relatively strong density reduction processing to the overall scanned image.

If the relatively strong density reduction processing is applied to all the regions of the scanned image GS (FIG. 7), the bar-code pattern PT may become thinner (lighter) than a predetermined extent in the copy output (refer to the image GC after the processing in FIG. 11). There arises a problem that when the copy output is further copied, the bar-code pattern PT cannot be read.

Figure 12:
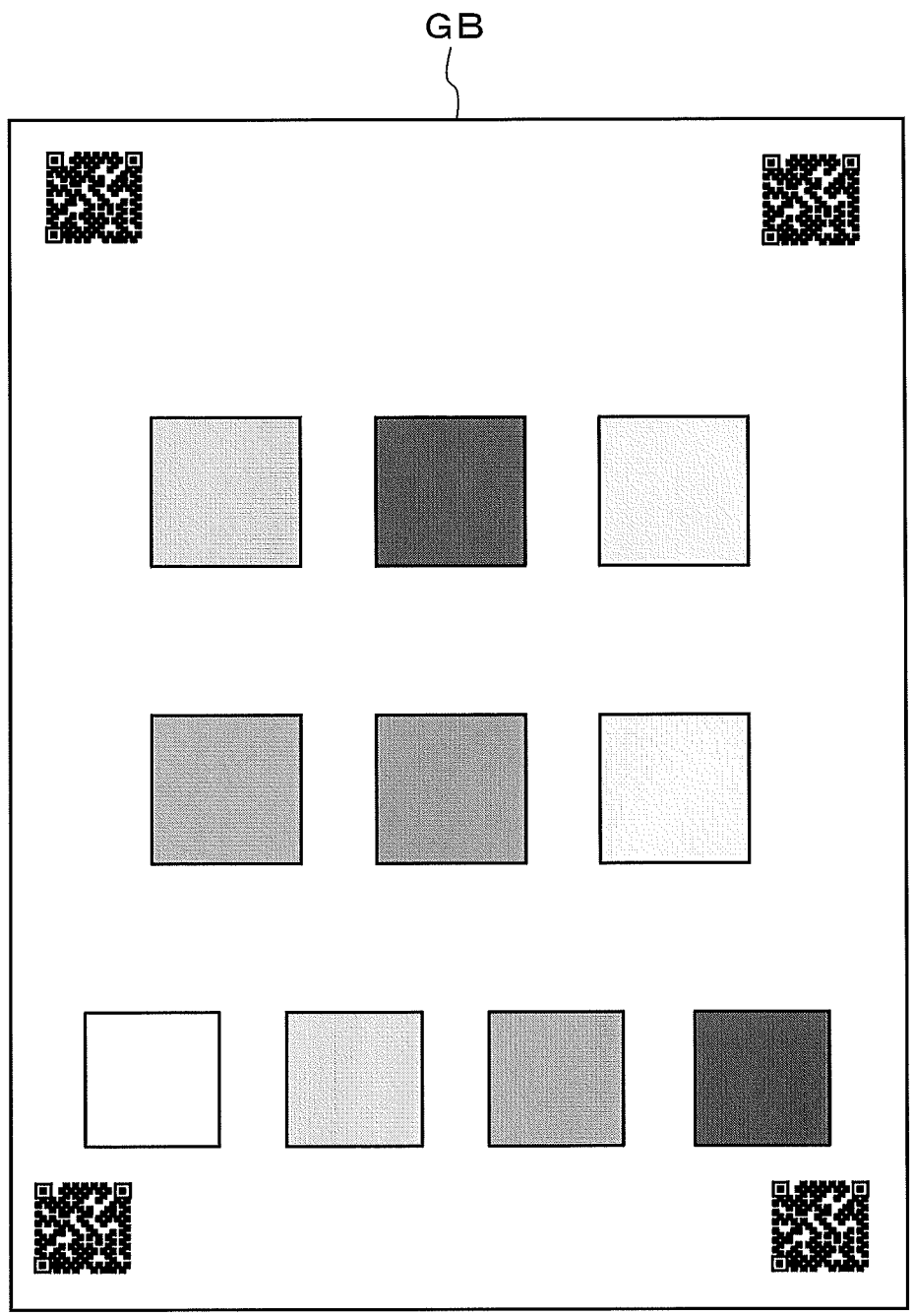
FIG. 12 is a diagram showing an example of an image processing result according to the present invention.

In contrast, the above-described concept may be applied to the density reduction processing, and the density reduction processing may be applied to the second region RG2, while the density reduction processing may not be applied to the first region RG1, by which the image for print output GP may be generated. FIG. 12 shows a state where the density reduction processing is not applied to the region RG1 (including the two-dimensional bar-code pattern PT), and the density reduction processing is applied only to the region RG2. This allows the deterioration of the two-dimensional bar-code pattern PT due to the density reduction processing to be avoided.

Alternatively, the above-described concept may be applied to base-color giving processing.

Figure 13:
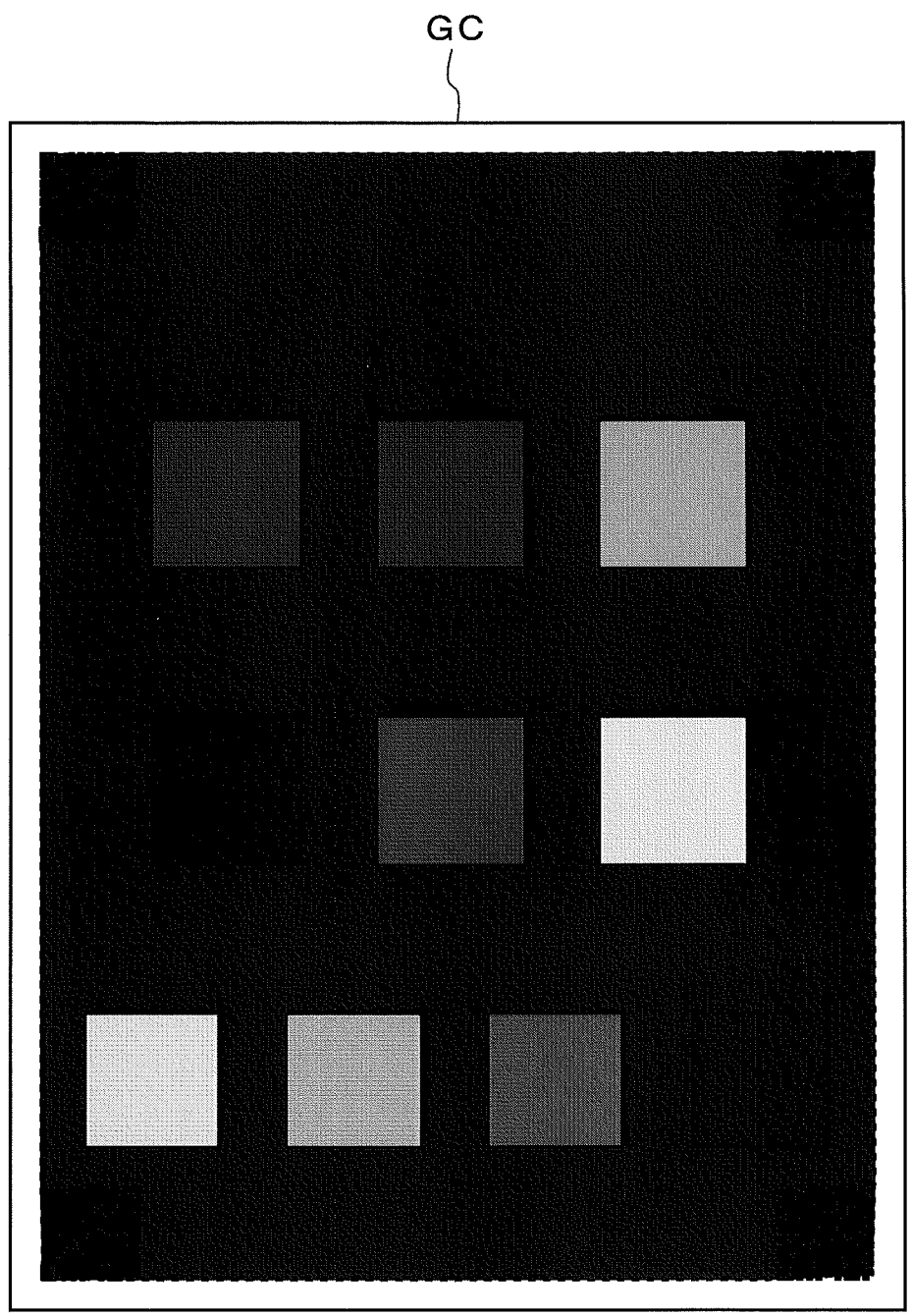
FIG. 13 is a diagram showing a state where base color giving processing to the overall scanned image.

If the base color giving processing is applied to all the regions of the scanned image GS, when a color of the bar-code pattern PT and a base color are close, the bar-code pattern PT may be disabled to be distinguished from a background in the copy output (refer to the image GC after the processing in FIG. 13). This causes a problem that when the copy output is further copied, the bar-code pattern PT cannot be read.

Figure 14:
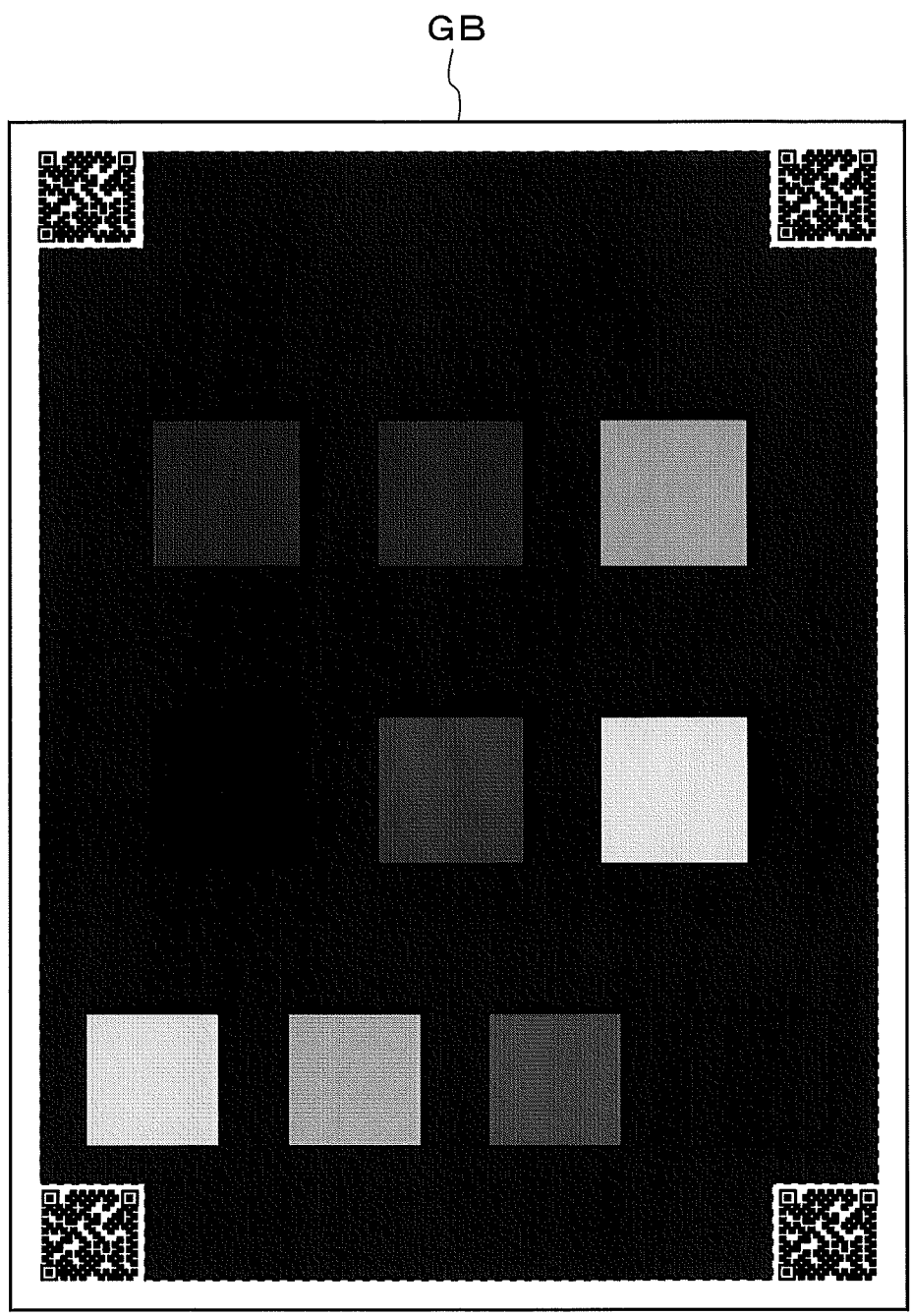
FIG. 14 is a diagram showing an example of an image processing result according to the present invention.

In contrast, the above-described concept may be applied to the base color giving processing, and the specific image working processing (base color giving processing) may be applied to the second region RG2, while the specific image working processing (base color giving processing) may not be applied to the first region RG1. FIG. 14 shows a state where the base color giving processing is not applied to the region RG1 (including the two-dimensional bar-code pattern PT), and the base color giving processing is applied only to the region RG2. This allows the deterioration of the two-dimensional bar-code pattern PT due to the base color giving processing to be avoided.

Alternatively, the above-described concept may be applied to magnification processing (especially, reduction processing).

Figure 15:
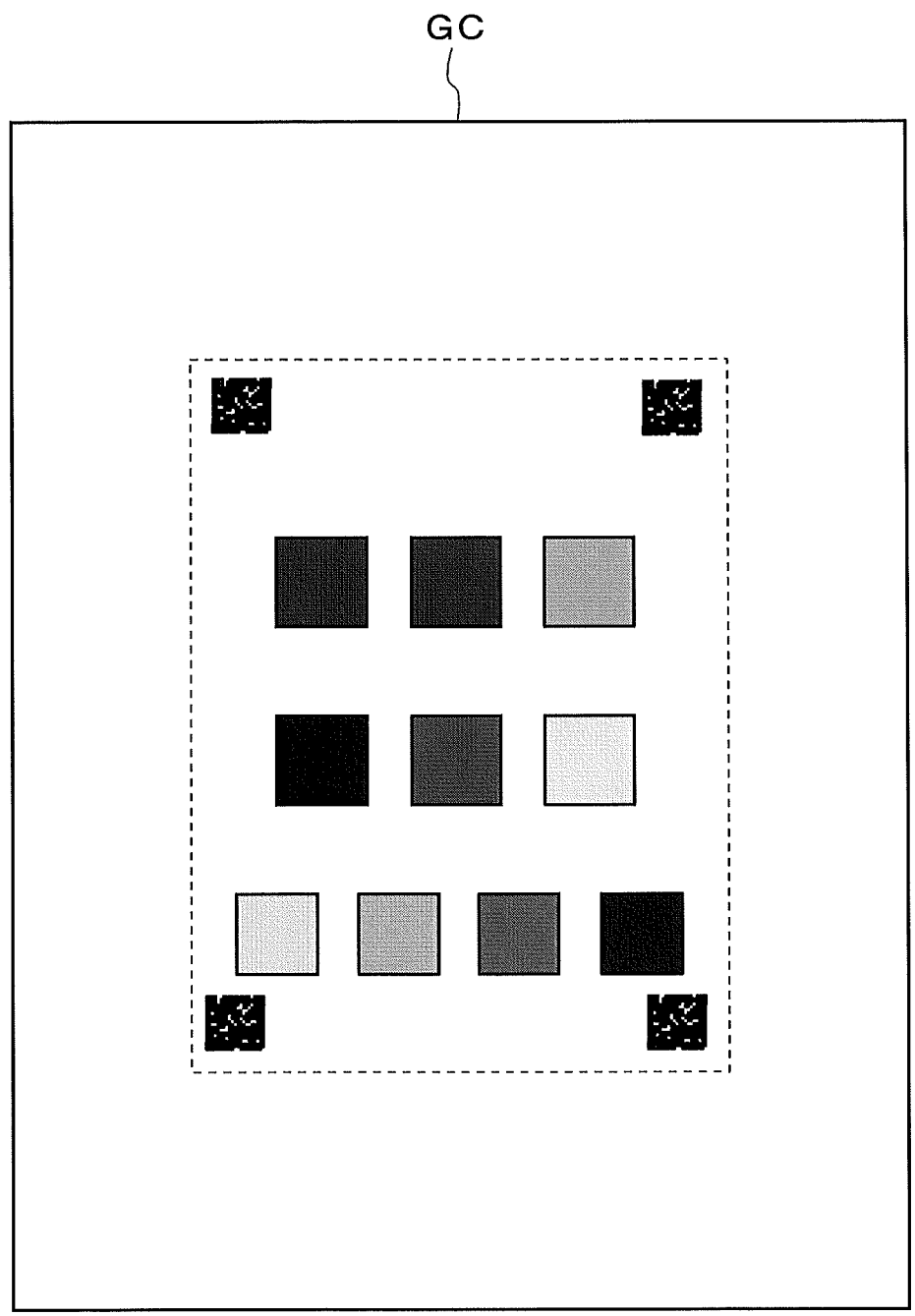
FIG. 15 is a diagram showing a state where reduction processing is applied to the overall scanned image.

If as shown in FIG. 15, the reduction processing is applied to all the regions of the scanned image GS (FIG. 7), the bar-code pattern PT may collapse and cannot be identified in the copy output. This arises a problem that when the copy output is further copied, the bar-code pattern PT cannot be read.

Figure 16:
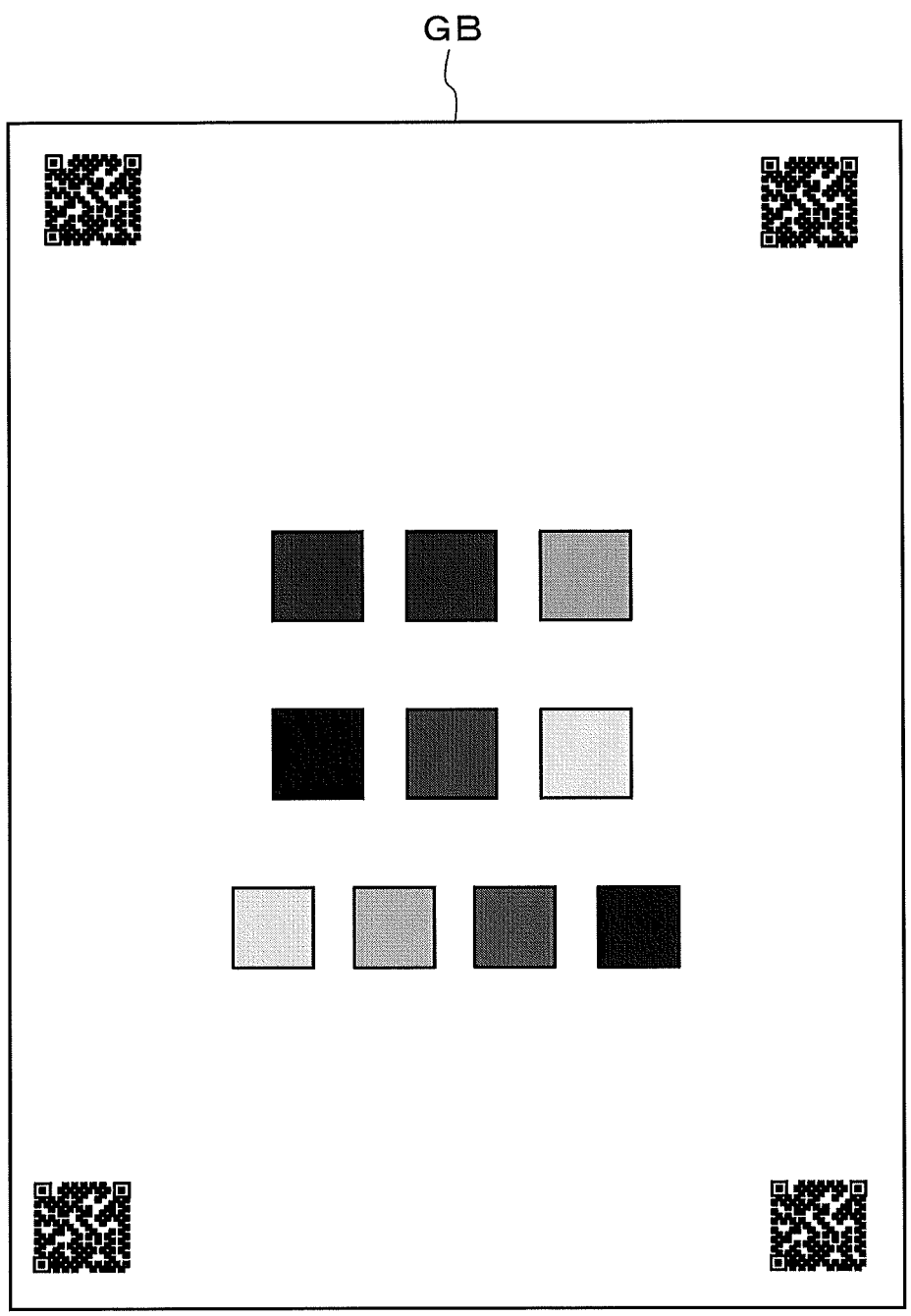
FIG. 16 is a diagram showing an example of an image processing result according to the present invention.

In contrast, the above-described concept may be applied to the reduction processing, and the specific image working processing (reduction processing) may be applied to the second region RG2, while the specific image working processing (reduction processing) may not be applied to the first region RG1. FIG. 16 shows a state where the reduction processing is not applied to the region RG1 (including the two-dimensional bar-code pattern PT), and the reduction processing is applied only to the region RG2. This allows the deterioration of the two-dimensional bar-code pattern PT due to the reduction processing to be avoided. The magnification processing is also referred to as pixel number conversion processing or resolution conversion processing.

Moreover, the above-described concept may be applied to another image working processing as well. For example, the above-described concept may be applied to ground removal processing or the like.

Furthermore, the above-described concept may be applied to each of the plurality of types of image working processing. For example, both the smoothing processing and the density reduction processing may be applied to the region RG2, and neither of them may be applied to the region RG1.

<2. Second Embodiment>

While the above-described first embodiment exemplifies the case where the specific image working processing is prohibited to the first region RG1, the present invention is not limited to this. This second embodiment exemplifies a case where in the specific image working processing, the working degree to the first region RG1 (degree of the smoothing in the smoothing processing) is set to be smaller than the working degree to the second region RG2. Hereinafter, a description is given, centering around different points from the first embodiment.

Figure 17:
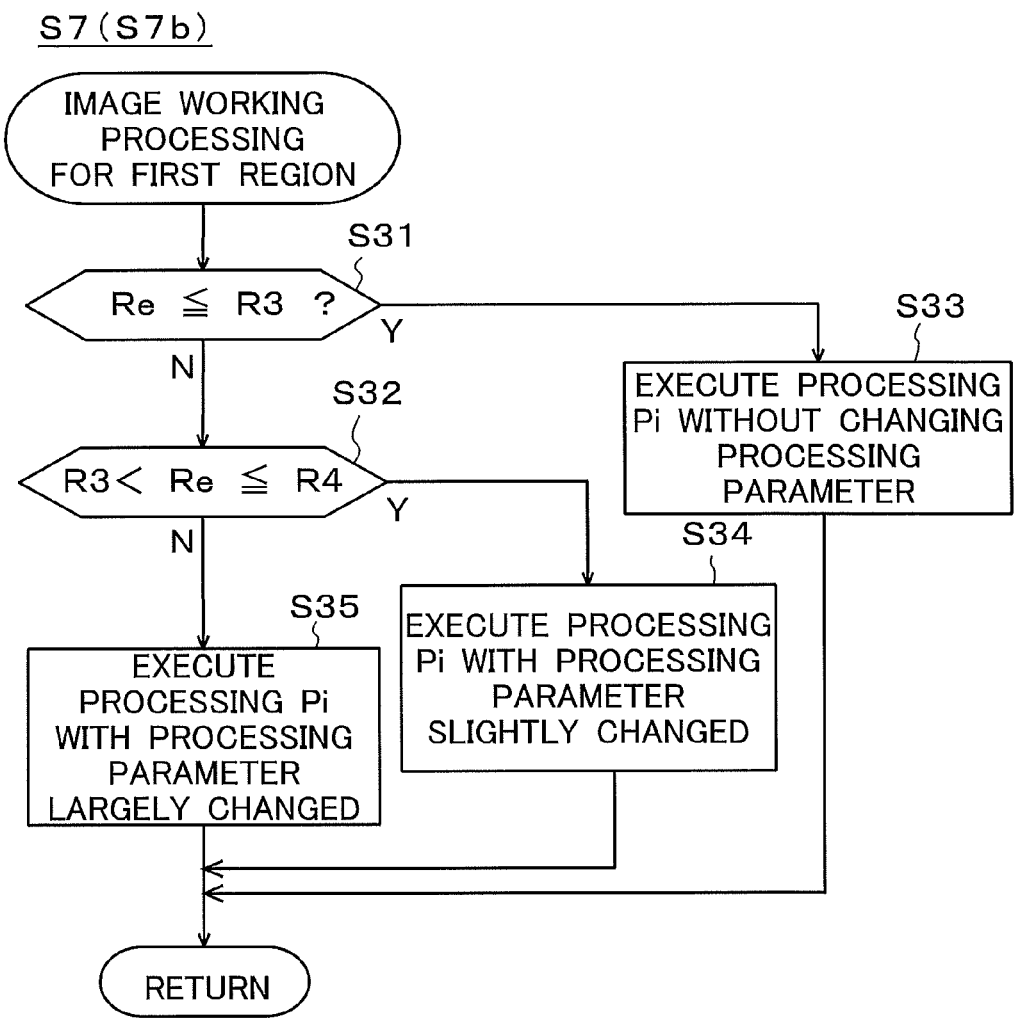
FIG. 17 is a flowchart showing a part of operation according to a second embodiment.

FIG. 17 is a flowchart showing a part of the operation according to the second embodiment. In the second embodiment, operation similar to that of FIG. 6 is executed as in the first embodiment. In the second embodiment, however, the operation in step S7 is different from that of the first embodiment. FIG. 17 is a flowchart showing detailed operation in step S7 (S7b) according to the second embodiment.

As shown in FIG. 17, in step S7b, whether or not the error detection ratio Re is larger than a predetermined value R3 (e.g., 1 percent) is first determined in step S31.

If the error detection ratio Re is not larger than the predetermined value R3, the extent of the deterioration in the scanned image GS is determined to be within the acceptable range, the processing proceeds to step S33. In step S33, the smoothing processing at a same strength (working degree) DG1 as that of step S8 is executed.

On the other hand, when the error detection ratio Re is larger than the predetermined value R3, whether or not the error detection ratio is larger than a predetermined value R4 (e.g., several percents) is further determined. Here, the value R4 is a value larger than the value R3 (R4>R3).

If it is determined that the error detection ratio Re is larger than the predetermined value R3 and not larger than the predetermined R4, then the processing proceeds to step S34. In step S34, the smoothing processing to a smaller working degree DG2 ("intermediate") than the working degree DG1 ("strong") in step S8 is executed. That is, DG2<DG1. In this manner, making smaller the degree of the smoothing processing to the region RG1 can suppress further image deterioration.

Moreover, if it is determined that the error detection ratio Re is larger than the predetermined value R4, then the processing proceeds to step S35. In step S35, the smoothing processing to a still smaller working degree DG3 ("weak") than the working degree DG2 ("intermediate") in step S34 is executed. That is, DG3<DG2. In this manner, making still smaller the degree of the smoothing processing to the region RG1 can suppress further image deterioration.

According to the above-described operation, the different image processing is applied to the first region RG1 and the second region RG2, respectively. Particularly, in the specific image working processing (smoothing processing) included in the image processing to the scanned image GS, the working degree differs between the first region RG1 and the second region RG2. Particularly, the working degree to the first region RG1 (DG2 or DG3) is smaller than the working degree to the second region RG2. Accordingly, the deterioration of the specific form pattern (two-dimensional bar-code pattern) inside the first region RG1 can be avoided or suppressed while applying the appropriate processing to the second region RG2. Eventually, decrease in reading ratio of the digital information at the time of copy or scanning in succeeding generations can be suppressed.

Moreover, in this embodiment, the working degree to the first region RG1 is changed in accordance with the error detection ratio Re. Particularly, as the error detection ratio Re becomes larger, a working degree DG in the smoothing processing becomes smaller. This can appropriately suppress further image deterioration by making smaller the degree of the smoothing to the region RG1 as the image deterioration of the scanned image GS becomes larger.

To this second embodiment, alterations similar to the modifications to the above-described first embodiment can be made.

For example, the working degree for each of the regions RG11 to RG14 in the specific image working processing (smoothing processing) may be changed in accordance with the error detection ratio Re of each of the regions RG11 to RG14.

Moreover, the order of the edge processing and the smoothing processing may be reverse, or only the single type of image working processing (smoothing processing) may be executed as the image processing to the scanned image GS.

Moreover, the image working processing executed in the different aspects to both the regions RG1, RG2 is not limited to the above-described smoothing processing. The concept similar to the above-described second embodiment may be applied to the density adjustment processing, the base color giving processing, the magnification processing and the like.

More particularly, the density reduction processing may be applied to the second region RG2 to a predetermined working degree DG11, while the working degree to the first region RG1 is changed in accordance with the error detection ratio Re and the density reduction processing is applied to the first region RG1. More specifically, as described above, as the error detection ratio Re becomes larger, the working degree DG to the first region RG1 in each of the types of image working processing may be set to a smaller value (DG12, DG13 or the like). The value DG12 is a smaller value than the value DG11, and the value DG13 is a smaller value than the value DG12 (DG11>DG12>DG13).

The foregoing is similar in the other types of image working processing.

Moreover, the above-described concept may be applied to the plurality of image working processing, respectively. For example, a certain type of image working processing (smoothing processing or the like) may be applied to the region RG1 and the region RG2 to the working degrees different from each other, and another type of image working processing (density reduction processing or the like) may be applied to the region RG1 and the region RG2 to the working degrees different from each other.

Furthermore, as to a certain type of image working processing among the plurality of types of image working processing, the operation similar to that of the first embodiment may be executed, and as to another type of image working processing, the operation similar to that of the second embodiment may be executed. For example, a certain type of image working processing (magnification processing or the like) may not be applied to the region RG1 but may be applied only to the region RG2, and another image working processing (smoothing processing or the like) may be applied to the region RG1 and the region RG2 to the working degrees different from each other.

<3. Third Embodiment>

The above-described embodiments have exemplified the case where the copyright notice or the like is embedded in the two-dimensional bar-code pattern PT. This third embodiment exemplifies a case where in addition to the copyright notice or the like, information indicating acceptable ranges of the working degrees of the respective types of image working processing (also referred to as working degree limit information or processing parameter limit information) is embedded in the two-dimensional bar-code pattern PT. While the respective embodiments exemplify the case where the contents and the like of the image working processing to the first region RG1 are changed based on the error detection ratio Re, the third embodiment exemplifies a case where the contents and the like of the image working processing to the first region RG1 are changed based on the "working degree limit information" embedded in the two-dimensional bar-code pattern PT. This third embodiment is a modification to the second embodiment. Hereinafter, a description is given centering around different points from the second embodiment.

FIG. 18 is a diagram showing acceptable ranges of the working degrees of the respective types of image working processing. Data TB1 inside a region surrounded by a dashed-line rectangular in FIG. 18 is included in the two-dimensional bar-code pattern PT according to the third embodiment.

For example, "P01" indicating a processing type number, "lower limit: 0.5" and "upper limit: 1.2" of the acceptable range relating to the working degree of the processing are included in the two-dimensional bar-code pattern PT. The MFP 10a recognizes that this processing type number "P01" is the image working processing relating to "lightness" (lightness adjustment processing), and also that the lower limit of the acceptable range relating to the working degree of the image working processing is 0.5 and the upper limit thereof is 1.2.

Similarly, "P02" indicating a processing type number, and "lower limit: weak" and "upper limit: intermediate" of the acceptable range relating to the working degree of the processing are included in the two-dimensional bar-code pattern PT. The MFP 10a recognizes that this processing type number "P02" is the image working processing relating to "smoothing" (smoothing processing), and also that the lower limit of the acceptable range relating to the working degree of the processing is "weak" and the upper limit thereof is "intermediate".

Similarly, "P03" indicating a processing type number, and "lower limit: 1.00" and "upper limit: 4.00" of the acceptable range relating to the working degree of the processing are included in the two-dimensional bar-code pattern PT. The MFP 10a recognizes that this processing type number "P03" is the image working processing relating to "magnification" (magnification processing), and also that the lower limit of the acceptable range relating to the working degree of the processing is 1.00 and the upper limit thereof is 4.00.

The foregoing is similar in the other types of image working processing, and the processing type number of each of the types of image working processing and the information indicating the acceptable range of the working degree in the image working processing are included in the two-dimensional bar-code pattern PT.

The above-described acceptable range may be set up, for example, based on performance of the print output apparatus (in this case, the MFP 10b) that prints out the print output GA. More specifically, when the print output performance of the print output apparatus is relatively high, the above-described acceptable range may be set to be relatively wide, and when the print output performance of the print output apparatus is relatively low, the above-described acceptable range may be set to be relatively narrow.

Here, the MFP 10a automatically sets the processing parameter (working degree) in the image working processing, or sets the same based on specification (designation) from a user. For example, the MFP 10a decides to perform the image working processing relating to "lightness" with the parameter of a normal value "1.0". Alternatively, the MFP 10a may decide to perform the lightness adjustment processing with the parameter of an instruction value "1.5" from the user, based on an explicit instruction from the user. The instruction value from the user may be set to an arbitrary value within a settable range in the MFP 10a, using the operation input unit 16a or the like. FIG. 18 shows that the settable range in the MFP 10a is a range of not less than 0.5 and not more than 4.0.

The foregoing is similar in the other types of image working processing. For example, the MFP 10a decides to perform the image working processing relating to the "smoothing" with the parameter of a normal value "strong".

The above-described automatic setting value (normal value or the like) and the instruction value from the user are merely candidate values for the processing parameter in the image working processing. The processing parameter (working degree) to the region RG1 in the image working processing is decided by adding correction to the candidate value as needed, based on the data TB1 included in the two-dimensional bar-code pattern PT. On the other hand, for the second region RG2, this candidate value is used as it is. In other words, the above-described candidate value (candidate parameter) is the same value as the parameter indicating the working degree to the second region RG2.

Figure 19:
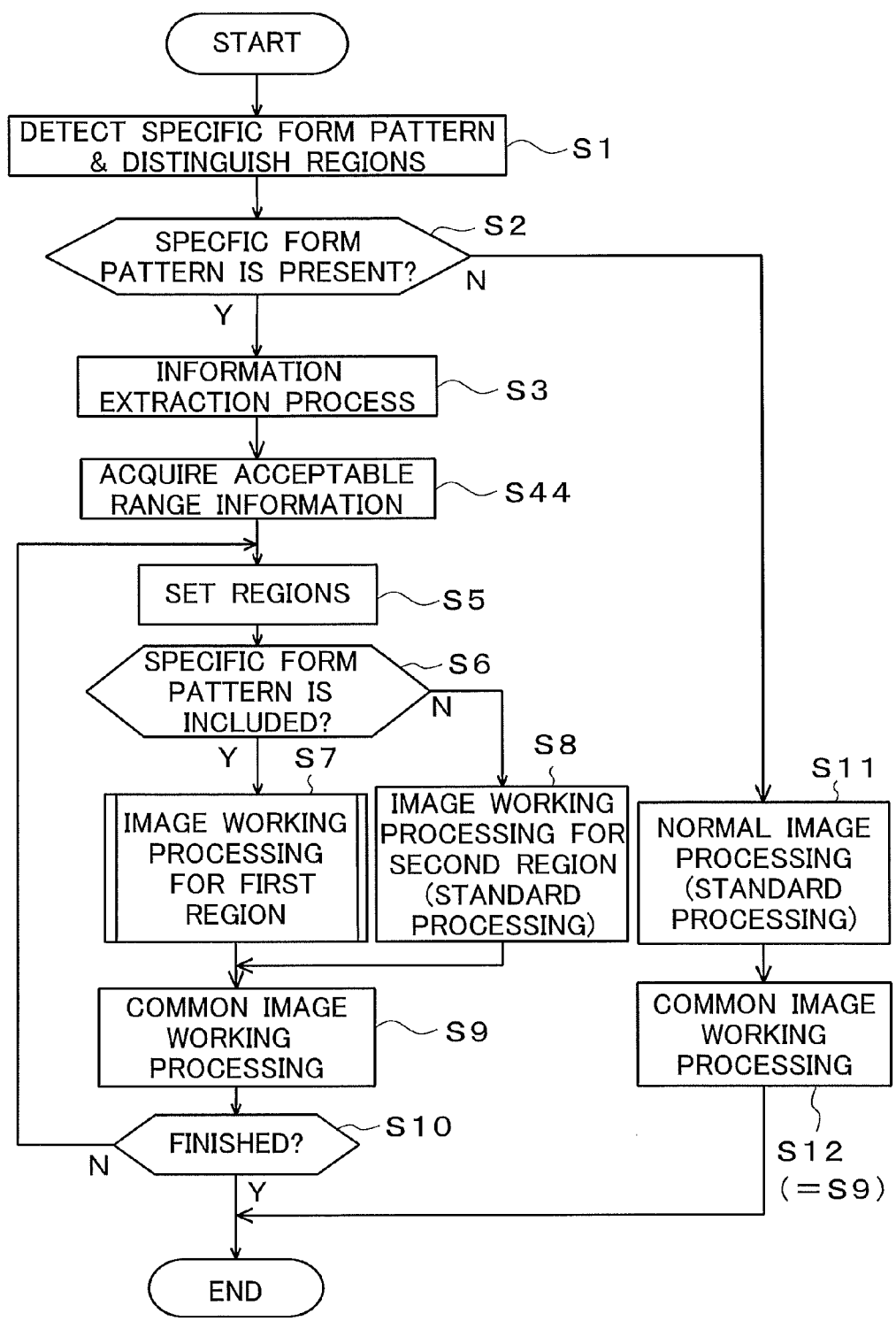
FIG. 19 is a flowchart showing operation according to a third embodiment.
Figure 20:
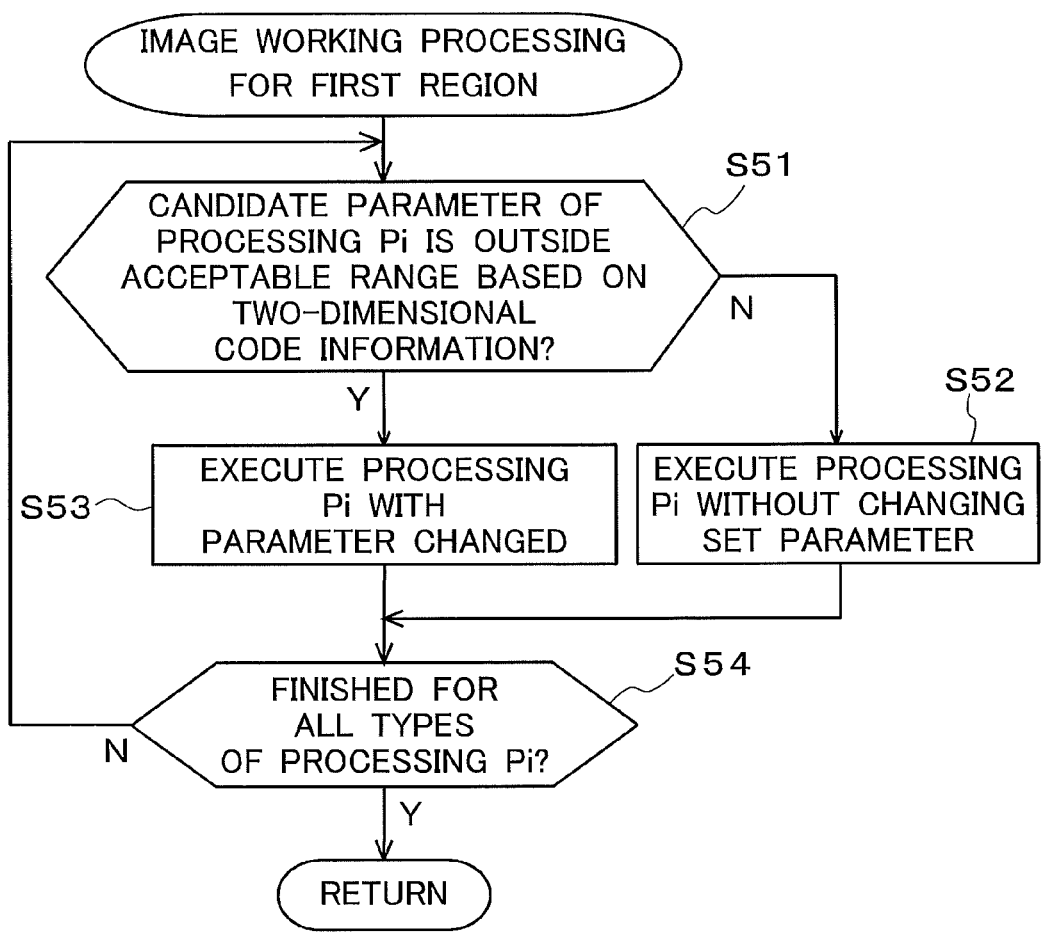
FIG. 20 is a flowchart showing the operation according to the third embodiment.

FIGS. 19 and 20 are flowcharts showing the operation according to the third embodiment. As shown in FIG. 19, the operation is different from the operation of the second embodiment (FIG. 6) in that in place of step S4, step S44 is executed following step S3. Moreover, the operation in step S7, as shown in FIG. 20, is also different from the operation of the second embodiment (FIG. 17). In FIG. 19, in the steps given the same reference numerals (step numbers), the operation similar to FIG. 6 is executed.

More specifically, in step S44 following step S3, the working degree limit information (data TB1) is acquired from the two-dimensional bar-code pattern PT. Particularly, the working degree limit information included in the digital information extracted in step S3 is acquired in this step S44.

Moreover, in step S7 (S7c), as shown in FIG. 20, it is first determined in step S51 whether or not the candidate value of the processing parameter in the specific image working processing (e.g., smoothing processing) is a value within the acceptable range in the corresponding image working processing acquired in step S44.

If the candidate value is a value within the acceptable range, the processing proceeds to step S52. In step S52, the specific image working processing is executed at the same strength as in step S8.

On the other hand, if the candidate value is outside the acceptable range, the processing proceeds to step S53. In step S53, the parameter (working degree) in the specific image working processing is changed to execute the specific image working processing. For example, the parameter (working degree) is changed to a value within the acceptable range (particularly, a value closer to the candidate value of the upper limit and the lower limit). Particularly, when the candidate value in the smoothing processing is "strong", and on the other hand, the acceptable range is from "weak" to "intermediate", the value closer to the candidate, that is, "intermediate" of the upper value and the lower value of the acceptable range is selected.

As described above, since the above-described candidate value (candidate parameter) is the same value as the parameter indicating the working degree to the second region RG2, the determination processing in step S51 is also expressed as the processing for determining whether or not the working degree to the second region RG2 is outside the above-described acceptable range.

Moreover, here, the case where a plurality of types of image working processing Pi are executed is exemplified. Therefore, for the plurality of types of image working processing Pi, the above-described processing is executed, respectively. Specifically, the processing from steps S51 to S54 is repeatedly executed until it is determined in step S54 that the processing for all the types of processing Pi is finished. As the respective types of image working processing Pi, as described above, various types of processing such as the smoothing processing, the density adjustment processing and the magnification processing are exemplified.

According to the above-described operation, the different processing is applied to the first region RG1 and the second region RG2, respectively. Accordingly, the deterioration of the specific form pattern (two-dimensional bar-code pattern) inside the first region RG1 can be avoided or suppressed while applying the appropriate processing to the second region RG2. Eventually, decrease in reading ratio of the digital information at the time of copy or scanning in the succeeding generations can be suppressed.

Moreover, in this third embodiment, the working degree to the first region RG1 is adjusted based on the working degree limit information included in the two-dimensional bar-code pattern PT. Specifically, under the condition that the working degree to the second region RG2 (also referred to as correction degree) is out of the acceptable range defined by the working degree limit information, the working degree to the first region RG1 is changed to a value within the "acceptable range", and the specific image working processing to the first region RG1 is executed. Accordingly, in view of the performance and the like of the print output apparatus, the working degree to the first region RG1 can be changed more flexibly.

Here, the case is exemplified where under the condition that the working degree to the second region RG2 is out of the acceptable range, the working degree to the first region RG1 is set to the value within the acceptable range and the specific image working processing to the first region RG1 is executed. However, the present invention is not limited to this. For example, in the specific image working processing, when the working degree to the second region RG2 (also expressed as the candidate value to the working degree to the first region) is out of the "acceptable range", the specific image working processing (smoothing processing or the like) may be prohibited to the first region RG1.

Moreover, to this third embodiment, alterations similar to the modifications to the above-described first and second embodiments can be made.

<4. Fourth Embodiment>

A fourth embodiment is a modification to the third embodiment. Hereinafter, a description is given centering around different points from the third embodiment.

In this fourth embodiment, the information indicating the acceptable range of the working degree of each of the types of image working processing (working degree limit information) is not embedded in the two-dimensional bar-code pattern PT. However, a "model code" of the print output apparatus that generated the print output GA is embedded in the two-dimensional bar-code pattern PT. Furthermore, in this fourth embodiment, a data table TB2 described below is stored in the storage unit 15 (refer to FIG. 5) of the apparatus (MFP 10a) that copies the print output GA. This data table TB2 is a data table that sets up the acceptable ranges of the working degrees of the respective types of image working processing based on a model of the print output apparatus as an output source of the original (print output GA or the like). To put it briefly, the data table is the working degree limit information for each model. The MFP 10a decides the acceptable range of the working degree relating to each of the types of the image working processing, based on the data table TB2 and the model code extracted from the two-dimensional bar-code pattern PT, so that the image working processing is executed to the first region RG1 to the working degree within the acceptable range.

FIG. 21 is a diagram showing the data table TB2. As shown in FIG. 21, the acceptable ranges of the working degrees of the respective types of image working processing are defined for each of a plurality of model codes (M001, M002, M003, . . . ).

For example, as to the model code "M001", the followings are defined: the acceptable range of the lightness adjustment processing is not less than "0.5" and not more than "1.2", the acceptable range of the smoothing processing is not less than "weak" and not more than "weak", and the acceptable range of the magnification processing is not less than "1.00" and not more than "4.00" and so on.

Similarly, as to the mode code "M002", the followings are defined: the acceptable range of the lightness adjustment processing is not less than "0.4" and not more than "1.5", the acceptable range of the smoothing processing is not less than "weak" and not more than "intermediate", and the acceptable range of the magnification processing is not less than "0.8" and not more than "4.00" and so on.

Moreover, as to the mode code "M003", the followings are defined: the acceptable range of the lightness adjustment processing is not less than "0.3" and not more than "1.5", the acceptable range of the smoothing processing is not less than "weak" and not more than "strong", and the acceptable range of the magnification processing is not less than "0.6" and not more than "4.00" and so on.

The foregoing is similar in the other models.

In this manner, in the data table TB2, the acceptable ranges of the working degrees in the respective types of image working processing are set up in accordance with the type of the print output apparatus that generates the print output GA. The acceptable range in the above-described data table TB2 may be set up based on the performance and the like of the print output apparatus (in this case, the MFP 10b) that prints out the print output GA. For example, when the print output performance of the print output apparatus is relatively high, the above-described acceptable range may be set to be relatively wide, and when the print output performance of the print output apparatus is relatively low, the above-described acceptable range may be set to be relatively narrow. Particularly, the acceptable range of the smoothing processing in the scan processing to the print output GA outputted by the relatively high-grade apparatus "M003" (1200 dpi output) may be set to a relatively wide range ("weak" to "strong"). On the other hand, the acceptable range of the smoothing processing in the scan processing to the print output GA outputted by the relatively low-grade apparatus "M001" (300 dpi output) may be set to a relatively narrow range (only "weak"). Thereby, especially in the low-grade model, the occurrence of collapse of the two-dimensional bar-code pattern PT attributed to the smoothing processing can be avoided or suppressed. The foregoing is similar in the other types of image working processing and the like.

Figure 22:
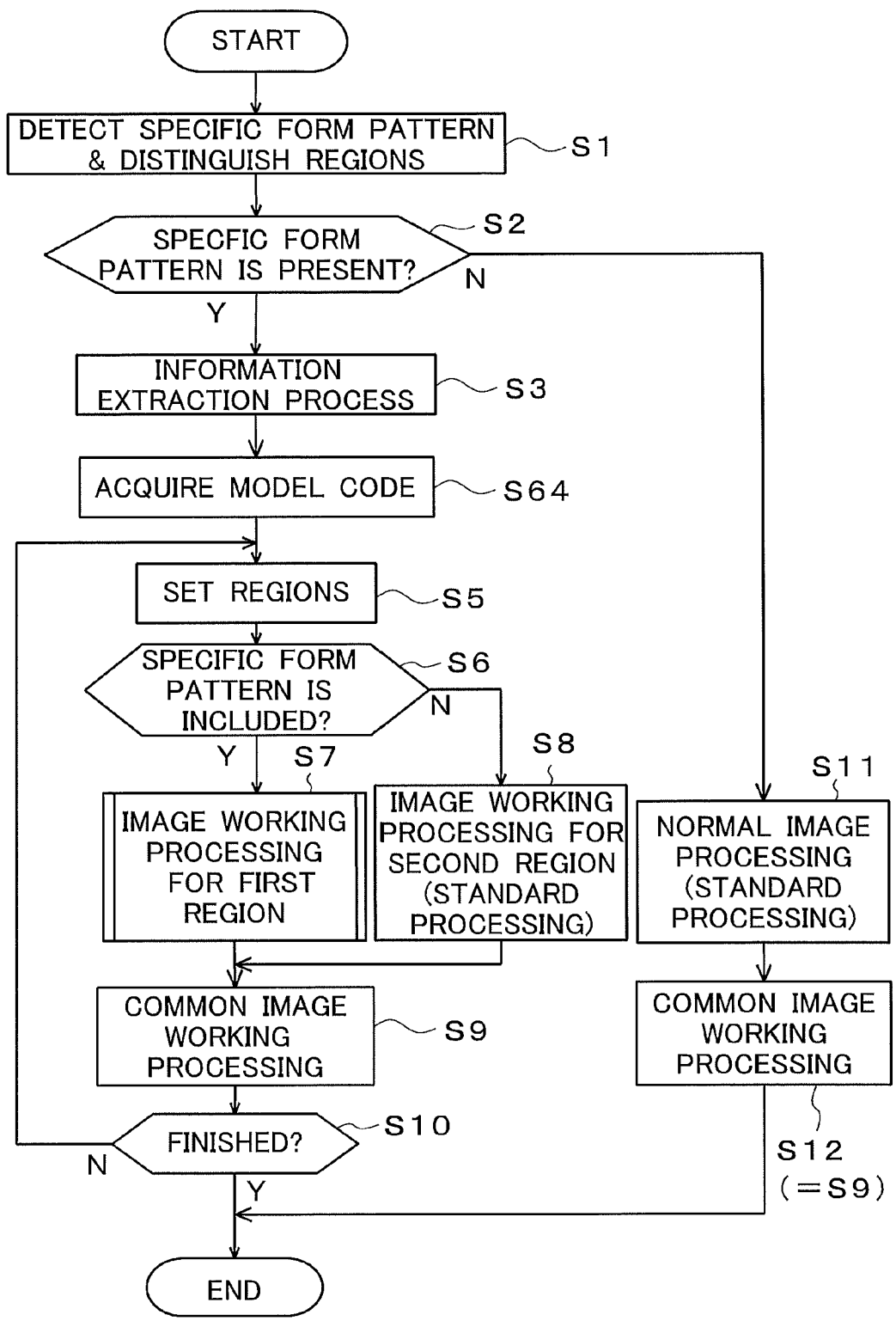
FIG. 22 is a flowchart showing operation according to a fourth embodiment.
Figure 23:
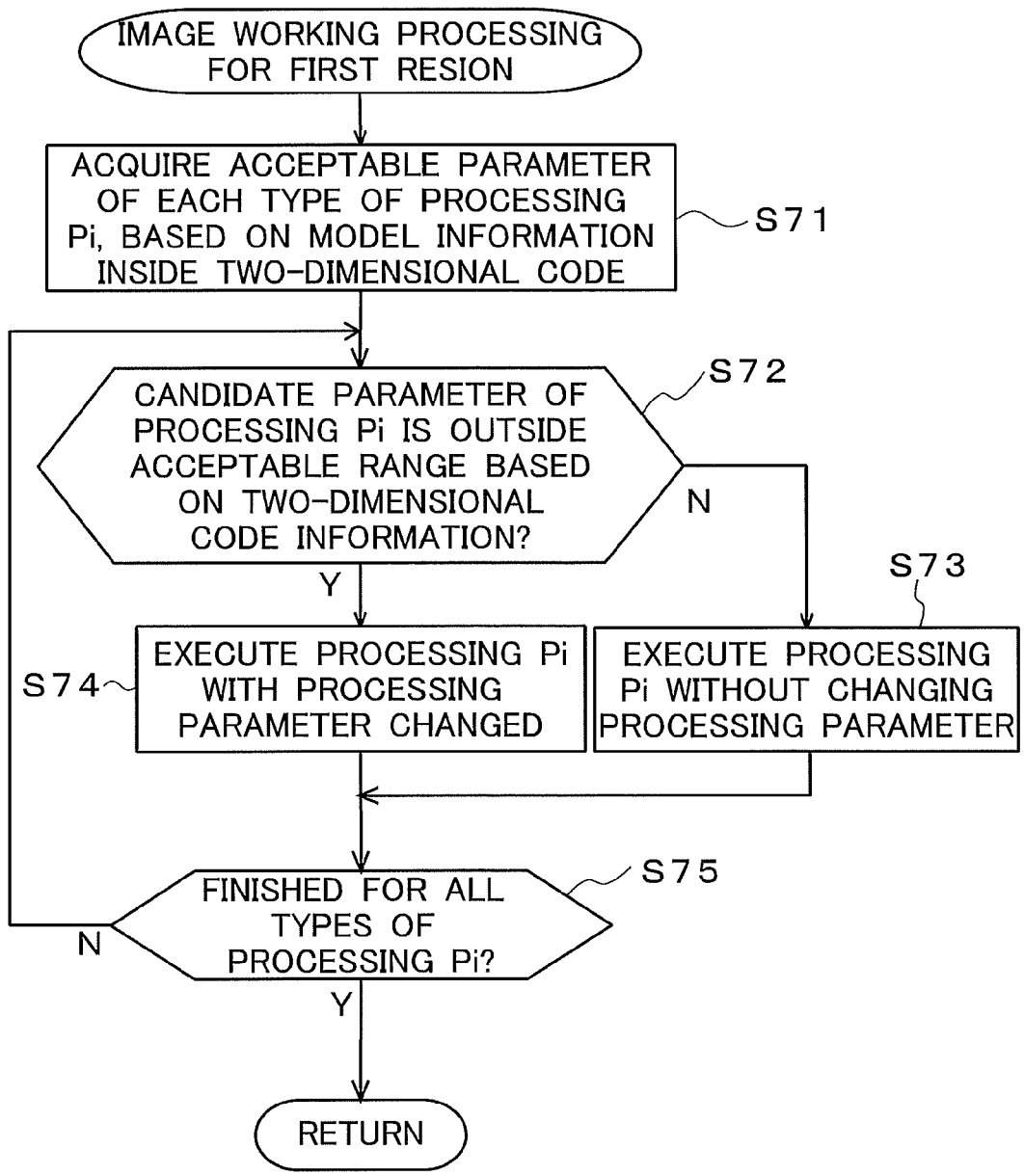
FIG. 23 is a flowchart showing the operation according to the fourth embodiment.

FIGS. 22 and 23 are flowcharts showing the operation of the fourth embodiment. As shown in FIG. 22, the operation is different from that of the third embodiment (FIG. 19) in that in place of step S44, step S64 is executed following step S3. Moreover, the operation in step S7 is also different from that of the third embodiment (FIG. 20) as shown in FIG. 23. In FIG. 22, in the steps given the same reference numerals (step numbers) as in FIG. 19, the operation similar to FIG. 19 is executed.

Specifically, in step S64 following step S3, a model code (also referred to as model information) is acquired from the two-dimensional bar-code pattern PT. Particularly, the "model code" included in the digital information extracted in step S3 is acquired in this step S64.

In step S7 (S7d), as shown in FIG. 23, in step S71, the acceptable ranges of the working degrees relating to the respective types of image working processing are first decided, based on the data table TB2 inside its own machine (MFP 10a) and the model code extracted from the two-dimensional bar-code pattern PT in step S64. For example, when the model code extracted from the two-dimensional bar-code pattern PT is "M001", the following contents are decided based on the data table TB2. Specifically, it is decided that the acceptable range of the lightness adjustment processing is not less than "0.5" and not more than "1.2", the acceptable range of the smoothing processing is not less than "weak" and not more than "weak" (i.e., only "weak"), the acceptable range of the magnification processing is not less than "1.00" and not more than "4.00", and so on.

Next, in step S72, it is determined whether or not the candidate value of the processing parameter in the specific image working processing (e.g., smoothing processing) is a value within the acceptable range decided in step S71.

If the candidate value is a value within the acceptable range, the processing proceeds to step S73. In step S73, the image working processing at the same strength as that in step S8 is executed.

On the other hand, if the candidate value is a value outside the acceptable range, the processing proceeds to step S74. In step S74, the parameter (working degree) in the specific image working processing is changed to execute the specific image working processing. For example, the parameter (working degree) is changed to a value closer to the candidate value of the upper limit and the lower limit of the acceptable range. Particularly, when while the candidate value in the smoothing processing is "strong", the acceptable range is only "weak", a value closer to the candidate value of the upper limit and the lower limit (in this case, the upper limit and the lower limit are the same) of the acceptable range, that is, "weak" is selected.

Hereinafter, the similar processing is executed for the respective types of image work processing Pi. Specifically, the processing from steps S72 to S75 is repeatedly executed until it is determined in step S75 that the processing for all the types of processing Pi is finished.

According to the above-described processing, under the condition that the working degree (correction degree) to the second region RG2 is out of the acceptable range defined by the working degree limit information, the working degree to the first region RG1 is changed to a value within the acceptable range to execute the specific image working processing to the first region RG1. Accordingly, the deterioration of the two-dimensional bar-code pattern PT inside the first region RG1 can be avoided or suppressed.

Moreover, especially, in this fourth embodiment, since the data table TB2 defines the working degree limit information in the respective types of image working processing based on the type (i.e., model) of the print output apparatus, the working degrees in the respective types of the image working processing can be adjusted more flexibly than those of the third embodiment.

Specifically, while in the third embodiment, it is premised that the relationships between the respective processing numbers P01 to P20 and the processing contents are fixed, in this fourth embodiment, the relationships between the respective processing numbers P01 to P20 and the processing contents may be arbitrarily defined in the data table TB2. That is, the data table TB2 can define the working degree limit information relating to the different types of image working processing, for each type (i.e., model) of the print output apparatus. For example, as to the model "M003", the working degree limit information relating to the plurality of types of image working processing including the different type of image working processing from those for the model "M001" can be defined. This allows the appropriate working degree limit information in accordance with the respective models to be defined more flexibly.

Moreover, in this fourth embodiment, the two-dimensional bar-code pattern PT is not required to have the working degree limit information for the respective plurality of types of image working processing, but only needs to have the model code of the print output apparatus that generated the print output GA. This can suppress an amount of information to be embedded in the two-dimensional bar-code pattern PT.

Here, the case has been exemplified where under the condition that the working degree to the second region RG2 is out of the acceptable range, the working degree to the first region RG1 is set to a value within the acceptable range, and the specific image working processing to the first region RG1 is executed. However, the present invention is not limited to this, but when the working degree to the second region RG2 is out of the acceptable range in the specific image working processing, the specific image working processing (smoothing processing or the like) may be prohibited to the first region RG1.

Moreover, to this fourth embodiment, alternations similar to the modifications to the above-described first and second embodiments can be made.

<5. Fifth Embodiment>

This fifth embodiment exemplifies a case where password information is embedded in the two-dimensional bar-code pattern PT. This fifth embodiment is a modification of the first embodiment. Hereinafter, a description is given, centering around different points from the first embodiment.

Figure 24:
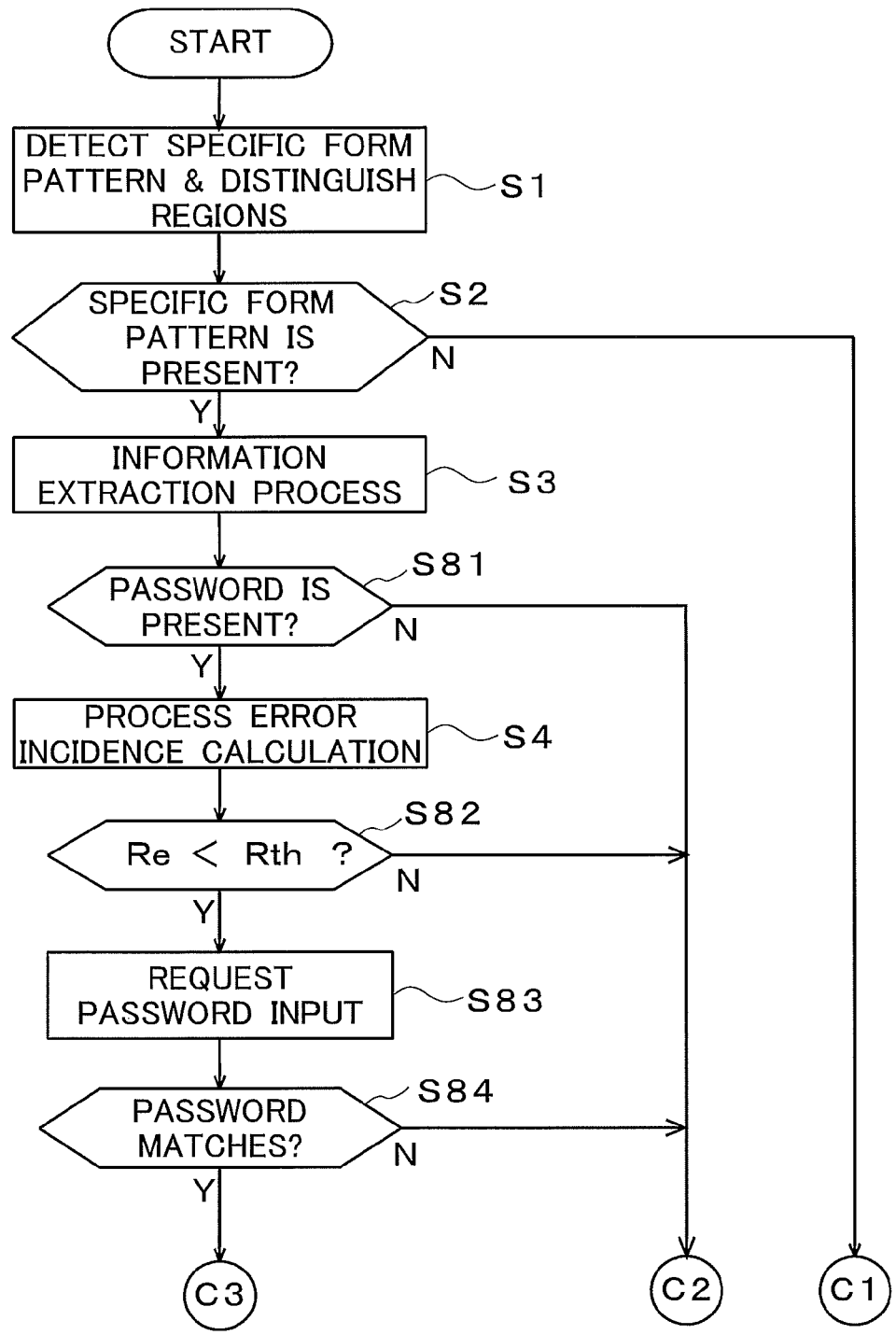
FIG. 24 is a flowchart showing the operation according to a fifth embodiment.
Figure 25:
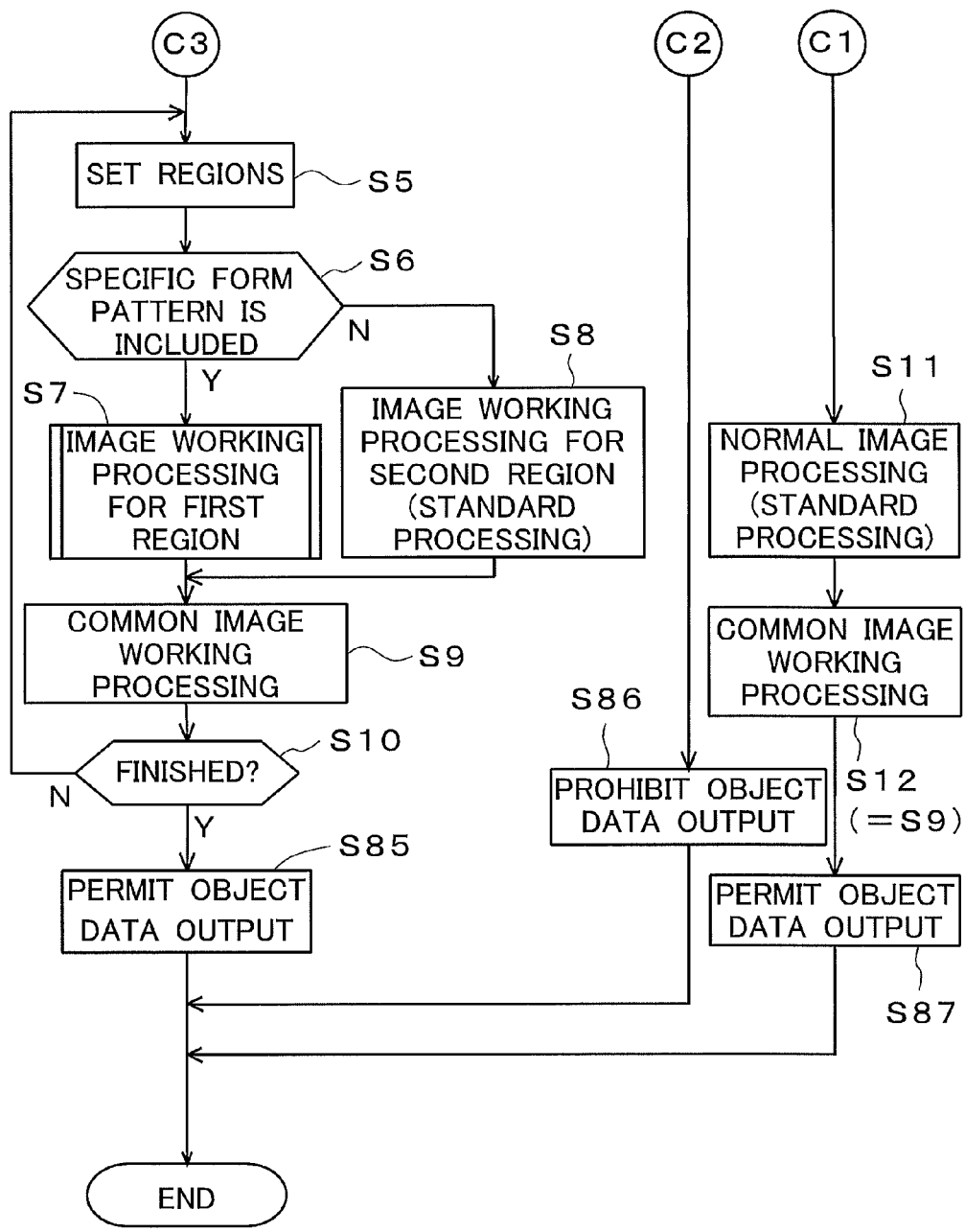
FIG. 25 is a flowchart showing the operation according to the fifth embodiment.

FIGS. 24 and 25 are flowcharts showing operation according to the fifth embodiment. In FIGS. 24 and 25, in steps given the same reference numerals (step numbers) as in FIG. 6, operation similar to that in FIG. 6 is executed. Hereinafter, a description is given, centering around different points from FIG. 6.

In step S81, in the information extraction processing in step S3, it is determined whether or not the password information is extracted from the two-dimensional bar-code pattern PT. Here, in the fifth embodiment, it is premised that the password information is always embedded in the two-dimensional bar-code pattern PT. Therefore, the case where although the existence of the two-dimensional bar-code pattern PT is confirmed in step S2, the password information is not extracted in step S81 means that reading of the password information from the two-dimensional bar-code pattern PT fails.

If the MFP 10a recognizes the reading failure of the password information, the processing proceeds to step S86 (FIG. 25), so that the output of the image GP based on the scanned image GS is prohibited. This can prevent the subsequent improper copy operation when the password is disabled to be read from the two-dimensional bar-code pattern PT.

On the other hand, if the password information is extracted, the processing in step S4 is executed, and then the processing proceeds to step S82.

In step S82, whether or not the error detection ratio Re is smaller than a predetermined value Rth is determined. If the error detection ratio Re is larger than the predetermined value Rth, the processing immediately proceeds to step S86 (without performing the processing in step S83), so that the output of the image GP based on the scanned image GS is prohibited. This allows subsequent improper copy operation to be avoided when image deterioration of the two-dimensional bar-code pattern PT reaches a predetermined extent, and so on.

On the other hand, if the error detection ratio Re is smaller than the predetermined value Rth, the processing proceeds to step S83. In step S83, password input is requested to the user, and validity of an inputted password is determined in step S84. Only when it is confirmed that the inputted password matches a qualified password, the processing proceeds to step S5. On the other hand, when it is confirmed that the inputted password does not match the qualified password, the processing proceeds to step S86, so that the output of the image GP based on the scanned image GS is prohibited. This can prevent subsequent improper copy operation.

The processing in step S5 and later is similar to that of the first embodiment. Moreover, in step S85, the output of the object image GP is permitted.

Moreover, if it is determined in step S2 that the two-dimensional bar-code pattern PT is not included in the scanned image GS, the processing in step S11 is executed, and then the processing further proceeds to step S87 via step S12 (=step S9). In step S87, the output of the object image GP is permitted.

In the above-described operation, even in the case where the password information is extracted from the two-dimensional bar-code pattern PT (step S81), if the error detection ratio Re is larger than the predetermined value Rth (step S82), the output of image GP based on the scanned image GS is immediately prohibited (step S86). According to this, when the image of the two-dimensional bar-code pattern PT is deteriorated by repeatedly copying, the print output operation (copy operation) and the like can be prohibited, in view of a possibility that the reliability of the password itself is decreased. This allows security relating to the original to be maintained.

To this fifth embodiment as well, alterations similar to the modifications to the above-described first to fourth embodiments can be made.

<6. Modifications and the Like>

While the embodiments of this invention have been described, this invention is not limited to the contents explained above.

For example, the above-described first embodiment has exemplified the case where the specific image working processing (smoothing processing or the like) is not executed to the first region RG1, and on the other hand, is executed to the second region RG2. However, the present invention is not limited to this. Specifically, conversely, the specific image working processing may be executed to the first region RG1, and on the other hand, may not be executed to the second region RG2. As the specific image working processing (image deterioration preventing processing), for example, the edge enhancement processing may be employed. According to this, the edge enhancement processing is not executed to the region RG2, and on the other hand, edges of the two-dimensional bar-code pattern PT inside the region RG1 can be enhanced. This can prevent the image deterioration of the two-dimensional bar-code pattern PT, and maintain the readability of the two-dimensional bar-code pattern PT. Moreover, this makes it unnecessary to apply useless image working processing to the region RG2. The specific image working processing may be some of the plurality of types of image working processing included in the image processing, or may be a single (only) type of image working processing included in the image processing.

Moreover, the above-described second embodiment has exemplified the case where for the specific image working processing (smoothing processing or the like) included in the image processing, the working degree to the first region RG1 is set to be smaller than the working degree to the second region. The present invention, however, is not limited to this. Conversely, for the specific image working processing (e.g., edge enhancement processing) included in the image processing, the working degree to the first region RG1 is set to be larger than the working degree to the second region and the image working processing to both the regions RG1, RG2 may be applied. As some of the types of image working processing in this case (image deterioration preventing processing), for example, the edge enhancement processing may be employed. According to this, by further enhancing the edges of the two-dimensional bar-code pattern PT inside the region RG1, the image deterioration of the two-dimensional bar-code pattern PT can be prevented, and readability of the two-dimensional bar-code pattern PT can be maintained and so on. The specific image working processing may be some of the plurality of types of image working processing included in the image processing, or may be a (only) single type of the image working processing included in the image processing.

Figure 26:
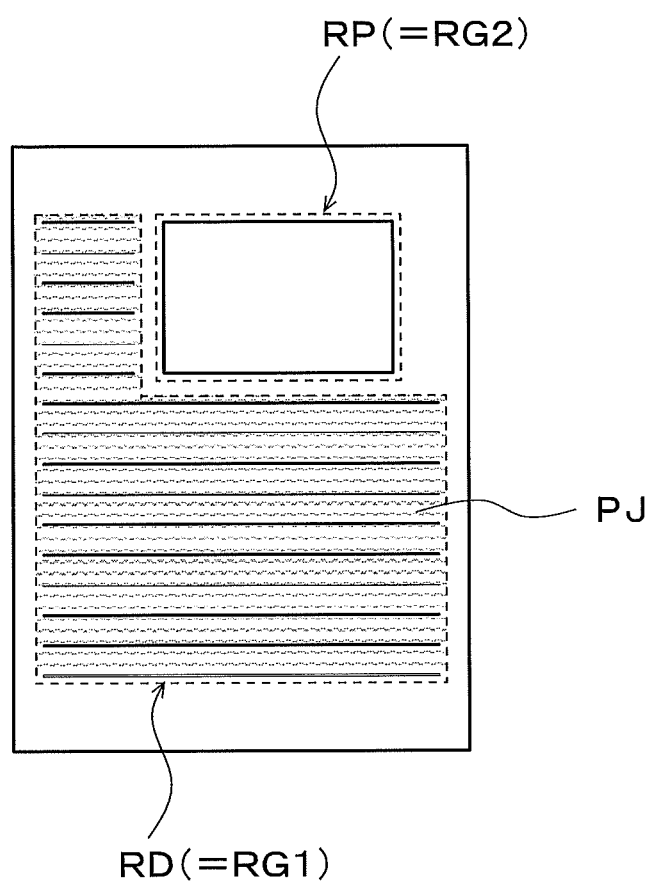
FIG. 26 is a diagram showing a processing object original (image including a tint) in a modification.

Moreover, while in the above-described embodiments, the two-dimensional bar-code pattern is exemplified as the specific form pattern with the digital information embedded therein, the present invention is not limited to this. For example, the specific form pattern may be a one-dimensional bar-code pattern. Alternatively, the specific form pattern may not be a bar-code pattern, but may be a tint pattern. FIG. 26 is a diagram showing the above-described modification.

FIG. 26 is a diagram showing a scanned image obtained by scanning an original having a document region RD and a photograph region RP. A tint pattern (also referred to as a woven pattern) PJ is embedded in the document region RD. In this tint pattern PJ, digital information similar to the digital information included in the above-described two-dimensional bar-code pattern PT is included. On the other hand, the tint pattern is not embedded in the photograph region RP. In such a scanned image, the document region RD with the tint pattern PJ embedded may be decided as the above-described region RG1, and the photograph region RP not having the tint pattern may be decided as the above-described region RG2 to execute the processing similar to the above-described embodiments. This allows the deterioration of the region RG1 including the tint pattern PJ to be avoided or suppressed. Eventually, decrease in reading ratio of the digital information at the time of copy or scanning in the succeeding generations can be suppressed.

Moreover, while in the above-described embodiments, descriptions have been given centering around the case where the present invention is applied to the image processing at the time of copy, the present invention is not limited to this. For example, the present invention may be applied to the image processing when the print output GA is scanned. In other words, it may not be required that the print output processing be executed immediately after the scanning processing, but only the image processing as described above may be executed to the scanned image GS.

While in the above-described embodiments, descriptions have been given, centering around the case where the present invention is applied to the MFP, the present invention is not limited to this. For example, the present invention may be applied to a computer system (merely referred to as a computer as well) that functions as an image processing apparatus.

Specifically, a scanner apparatus and a printer apparatus (print output apparatus) are connected to a computer including a CPU, a semiconductor memory and the like. The computer acquires the scanned image GS generated by the scanner apparatus, and applies the image processing to the scanned image GS to generate the scanned image GP after the image processing. Moreover, the computer outputs the image GP to the printer apparatus to cause the printer apparatus to generate a print output. In the above-described series of processing, the above-described concepts may be applied to the image processing executed in the computer. Particularly, by executing a predetermined program using the CPU and the like of the computer, the computer may be caused to function as the image processing apparatus having the above-described concepts. The programs according to the modification and the above-described embodiments may be provided through a network, or may be provided by a predetermined computer-readable recording medium (e.g., a USB memory (portable memory), a CD-ROM or the like).

While the invention has been shown and described in detail, the foregoing description is in all aspects illustrative and not restrictive. It is therefore understood that numerous modifications and variations can be devised without departing from the scope of the invention.

What is claimed is:

1. An image processing apparatus comprising:
an acquisition unit that acquires a scanned image of an original;
a specification unit that specifies, in said scanned image, a first region including a specific form pattern with digital information embedded therein and a second region not including said specific form pattern;
an image processing unit that applies image processing to said scanned image,
wherein said image processing unit applies different processing to said first region and said second region, respectively;
wherein said image processing unit applies specific image working processing included in said image processing to said first region and to said second region, respectively;
in said specific image working processing, a working degree to said first region and a working degree to said second region are different from each other; and
an extraction unit that analyzes said specific form pattern and extracts said digital information,
wherein said image processing unit changes the working degree to said first region in accordance with an error detection ratio during the extraction of said digital information.

2. An image processing apparatus comprising:
an acquisition unit that acquires a scanned image of an original;
a specification unit that specifies, in said scanned image, a first region including a specific form pattern with digital information embedded therein and a second region not including said specific form pattern;
an image processing unit that applies image processing to said scanned image,
wherein said image processing unit applies different processing to said first region and said second region, respectively;
wherein said image processing unit applies specific image working processing included in said image processing to said first region and to said second region, respectively;
in said specific image working processing, a working degree to said first region and a working degree to said second region are different from each other; and
an extraction unit that analyzes said specific form pattern and extracts said digital information,
wherein said digital information includes working degree limit information indicating an acceptable range of the working degree relating to said specific image working processing, and
said image processing unit executes said specific image working processing to said second region at a first working degree, and on the other hand,
under a condition that said first working degree is out of said acceptable range, the working degree to said first region is changed to a second working degree within said acceptable range to execute said specific image working processing to said first region.

3. An image processing apparatus comprising:
an acquisition unit that acquires a scanned image of an original;
a specification unit that specifies, in said scanned image, a first region including a specific form pattern with digital information embedded therein and a second region not including said specific form pattern;
an image processing unit that applies image processing to said scanned image,
wherein said image processing unit applies different processing to said first region and said second region, respectively;
wherein said image processing unit applies specific image working processing included in said image processing to said first region and to said second region, respectively;
in said specific image working processing, a working degree to said first region and a working degree to said second region are different from each other; and
an extraction unit that analyzes said specific form pattern and extracts said digital information; and
a storage unit that stores working degree limit information defining an acceptable range of the working degree in said specific image working processing, for each model of print output apparatuses including a print output apparatus as an output source of said original,
wherein said digital information includes model information of the print output apparatus that printed out said original,
said image processing unit acquires an acceptable range of the working degree to said first region in said specific image working processing, based on said model information included in said digital information and said working degree limit information stored in said storage unit,
said specific image working processing is executed to said second region at a first working degree, and
under a condition that said first working degree is out of said acceptable range, the working degree to said first region is changed to a second working degree within said acceptable range to execute the specific image working processing to said first region.

4. An image processing apparatus comprising:
an acquisition unit that acquires a scanned image of an original;
a specification unit that specifies, in said scanned image, a first region including a specific form pattern with digital information embedded therein and a second region not including said specific form pattern;

an image processing unit that applies image processing to said scanned image;

wherein said image processing unit executes, to said second region, specific image working processing among a plurality of types of image working processing included in said image processing, and on the other hand, prohibits the same to said first region;

an extraction unit that analyzes said specific form pattern and extracts said digital information; and wherein under a condition that an error detection ratio during the extraction of said digital information is larger than a predetermined value, said image processing unit prohibits said specific image working processing to said first region.

5. An image processing apparatus comprising:

an acquisition unit that acquires a scanned image of an original;

a specification unit that specifies, in said scanned image, a first region including a specific form pattern with digital information embedded therein and a second region not including said specific form pattern;

an image processing unit that applies image processing to said scanned image, wherein said image processing unit applies different processing to said first region and said second region, respectively;

an extraction unit that analyzes said specific form pattern and extracts said digital information; and an output control unit that prohibits output of an image based on said scanned image, when an error detection ratio during the extraction of said digital information is larger than a predetermined value.

6. An image processing apparatus comprising:

an acquisition unit that acquires a scanned image of an original;

a specification unit that specifies, in said scanned image, a first region including a specific form pattern with digital information embedded therein and a second region not including said specific form pattern;

an image processing unit that applies image processing to said scanned image, wherein said image processing unit applies different processing to said first region and said second region, respectively;

an extraction unit that analyzes said specific form pattern and extracts said digital information; and an output control unit that controls whether to permit or prohibit output of said scanned image, wherein in a case where password information is extracted as said digital information, said output control unit prohibits the output of an image based on said scanned image, when an error detection ratio during the extraction of said digital information is larger than a predetermined value.

* * * * *